US008983815B2

(12) United States Patent
Bleackley et al.

(10) Patent No.: US 8,983,815 B2
(45) Date of Patent: Mar. 17, 2015

(54) CONFIGURATION ENGINE FOR A PROCESS SIMULATOR

(75) Inventors: David Bleackley, Shropshiro (GB); Willem Van Wassenhove, Oudenaarde (BE)

(73) Assignee: Aspen Technology, Inc., Bedford, MA (US)

( * ) Notice: Subject to any disclaimer, the term of this patent is extended or adjusted under 35 U.S.C. 154(b) by 129 days.

(21) Appl. No.: 13/091,932

(22) Filed: Apr. 21, 2011

(65) Prior Publication Data
US 2011/0264415 A1 Oct. 27, 2011

Related U.S. Application Data

(60) Provisional application No. 61/326,906, filed on Apr. 22, 2010.

(51) Int. Cl.
G06G 7/58 (2006.01)
G06F 17/50 (2006.01)

(52) U.S. Cl.
CPC ........ G06F 17/5004 (2013.01); G06F 2217/16 (2013.01); G06F 2217/80 (2013.01)
USPC .......................................................... 703/6

(58) Field of Classification Search
CPC ............ G06F 17/5009; G06F 17/5004; G06F 2217/80; G06F 2217/16; E21B 41/00
USPC .............................. 703/6, 10, 13, 1, 12; 702/6
See application file for complete search history.

(56) References Cited

U.S. PATENT DOCUMENTS 5,666,297 A 9/1997 Britt et al.
5,809,490 A 9/1998 Guiver et al.
5,841,678 A * 11/1998 Hasenberg et al. ............. 703/10
2003/0201098 A1* 10/2003 Karanikas et al. .............. 702/12
2008/0103743 A1* 5/2008 Howell et al. .................. 703/10
2009/0012765 A1* 1/2009 Raphael ......................... 703/10
2009/0182541 A1* 7/2009 Crick et al. .................... 703/10

(Continued)

FOREIGN PATENT DOCUMENTS

WO WO 2011/133805 A2 10/2011

OTHER PUBLICATIONS

Landmark "Decision management SystemTM (DMSTM) Software", 2008. Landmark Graphics Corporation. http://www.halliburton.com/public/landmark/contents/data_sheets/web/h05089.pdf.*

(Continued)

Primary Examiner — Eunhee Kim
(74) Attorney, Agent, or Firm — Hamilton, Brook, Smith & Reynolds, P.C.

(57) ABSTRACT

A computer modeling apparatus includes an input module enabling user specification of a subject facility design based on limited data. The subject facility design includes design alternatives, and a processor routine coupled to the input module and responsive to the user specification by forming an input data set to a rigorous simulation modeler to model the subject facility design. The rigorous simulation modeler requires input beyond the limited data. The processor routine enables execution of the simulation modeler. The computer modeling apparatus further includes an interface member that enables the production of a rigorous simulation model of the subject facility design from the simulation modeler. The subject facility is one of an oil processing facility, a gas processing facility, an oil and gas separation facility, or a chemical processing facility.

29 Claims, 21 Drawing Sheets

(56) References Cited

U.S. PATENT DOCUMENTS

2009/0198478 A1* 8/2009 Cuevas et al. ............... 703/10
2009/0234625 A1* 9/2009 Zangl et al. ................. 703/10
2009/0292514 A1* 11/2009 McKim et al. .............. 703/6

OTHER PUBLICATIONS aspentech "HYSYS 2004.2 Tutorials & Applications"., 2005. 557 Pages.*

Notification of Transmittal of the International Search Report and the Written Opinion of the International Searching Authority for Int'l Application No. PCT/US2011/033481; Date Mailed: Oct. 2, 2012.

Cullick, A.S. et al., "Optimizing Field Development Concepts for Complex Offshore Production Systems," Offshore Europe Conference—Proceedings—Society of Petroleum Engineers (SPE), SPE 1085, Sep. 7, 2007, pp. 1-10.

Notification Concerning Transmittal of International Preliminary Report on Patentability for Int'l Application No. PCT/US2011/033481, Date Mailed: Nov. 1, 2012.

API Technical Data Book, Chapter 2: *Characterization of Hydrocarbons*, $5^{th}$ Ed. 1992.

* cited by examiner

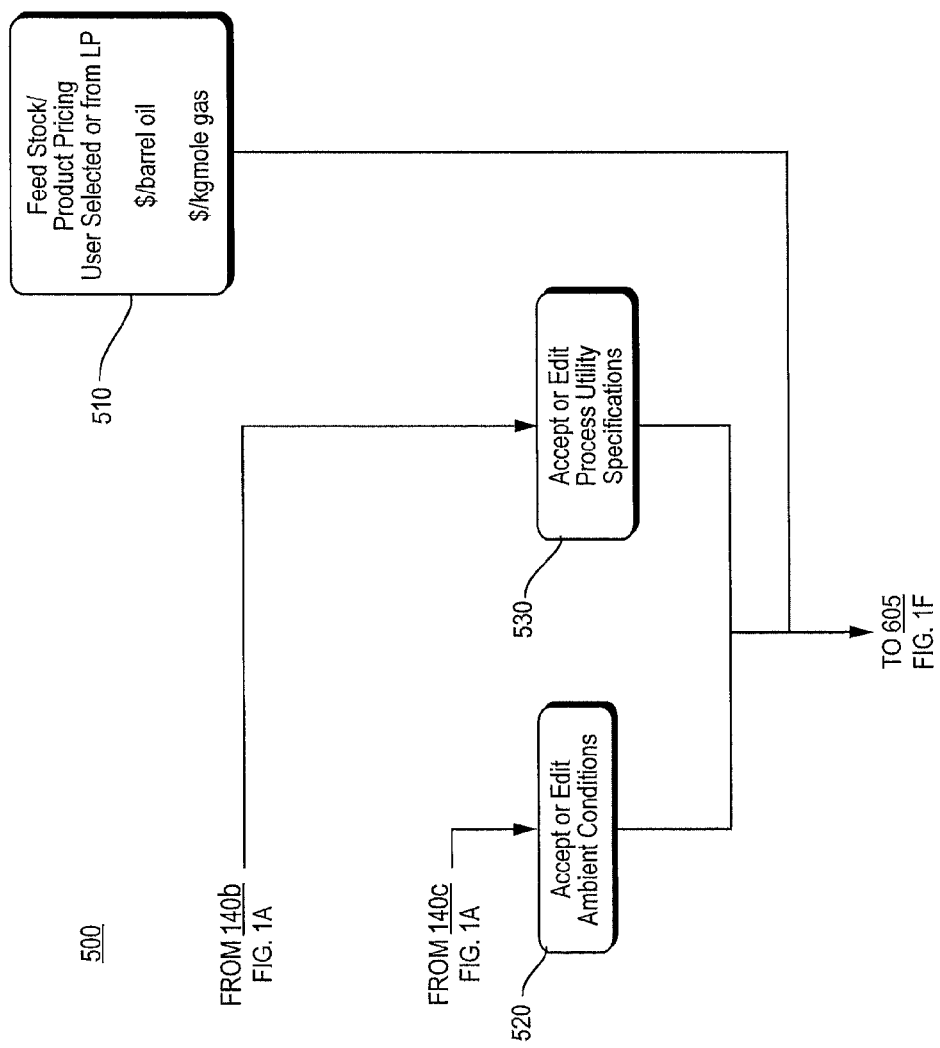

CONFIGURATION ENGINE FOR A PROCESS SIMULATOR

RELATED APPLICATION

This claims the benefit of U.S. Provisional Application No. 61/326,906, filed on Apr. 22, 2010.

The entire teachings of the above application are incorporated herein by reference.

BACKGROUND OF THE INVENTION

In the design of a process plant, such as, for example, an oil and gas facility, a gas cleaning plant, a carbon dioxide capture facility, a liquefied natural gas (LNG) plant, an oil refinery, or a petrochemical facility (e.g., an ethylene plant), companies need to make major multi-million dollar investment decisions about the most appropriate capacity, location, and functionality of the facility, typically with very limited information, particularly at preliminary stages of the design. There are many potential configuration and design options, making it difficult to identify viable options and to compare them on a consistent basis, so that the optimal design can be selected for the best match to business criteria and operational constraints, and for a sound economic return on investment. At present, engineers and business managers address this problem by a variety of short-cut design methods and practices, standards, and approximations for design selection. These methods have been encapsulated in software applications, linear programming (LP) models, and tools such as, for example, Microsoft EXCEL®. Alternatively, companies base their assessments on large libraries of previous typical designs and costing databases. Templates, which can be re-used and edited by the user, are typically used for sub-processes. The use of templates is generally impractical for entire processes, due to large variations in process conditions and constraints for each specific process.

At present, the design of process facilities is becoming more complex, due to many factors such as, for example, more complex feedstocks, higher feed pressures and temperatures, the presence of trace elements, tighter product quality specifications, tighter environmental and safety constraints, and more volatile market conditions and global economic factors. The added complexity increases the necessity to scrutinize design options more thoroughly earlier in the design cycle, in order to accurately assess project risks and avoid design rework at later stages of the design cycle or the procurement of inappropriate or incorrect equipment.

Present design methods are not sufficiently rigorous in taking into account the underlying thermodynamics, physical properties, and unit operation and equipment design methods to meet the increasing technical complexity of modern process design and the increasing scrutiny of technical risks. Rigorous process simulators, which could provide the level of detail required for modern process design, are typically only used to validate the final few selected design alternatives, in part because rigorous process simulators typically require input of detailed process data. Such data is generally limited or not available at the early stages of process design. The user must either obtain the input data or apply an engineering assumption based on the user's experience or an industry or company guideline. Furthermore, the manual configuration by the user of plant topology and connectivity is quite time consuming, making it impractical to create a rigorous process simulation model of each potential design alternative.

Therefore, there is a need for a pre-screening and configuration engine for a rigorous process simulator.

SUMMARY OF THE INVENTION

The invention generally is directed to a pre-screening and configuration engine for a rigorous process simulator.

In one embodiment, a computer modeling apparatus includes an input module enabling user specification of a subject facility design based on limited data. The subject facility design includes design alternatives, and a processor routine coupled to the input module and responsive to the user specification by forming an input data set to a rigorous simulation modeler to model the subject facility design. The rigorous simulation modeler requires input beyond the limited data. The processor routine enables execution of the simulation modeler. The computer modeling apparatus further includes an interface member that enables the production of a rigorous simulation model of the subject facility design from the simulation modeler. In some embodiments, the computer modeling apparatus further includes an output member that produces a rigorous simulation model of the subject facility design from the simulation modeler.

The limited data includes any combination of a type of facility, a production rate profile, a geographic location, environmental factors, political factors, social factors, feedstock pricing, and product pricing. Alternatively, the limited data includes a predefined linear program model of the subject facility, including facility topology, feedstock specifications, principal reactor/conversion unit processes, product specifications, and design alternatives. The processor routine employs any one of a feedstock database, a process utility specifications database, an ambient conditions database, or a combination thereof, to form the input data set.

The input module streamlines user workflow of inputting data for the simulation modeler.

In some embodiments, the processor routines employs one of rule-based decision making, a set of templates, database data, or a combination thereof. The simulation modeler can be a process simulator. The produced simulation model can be extensible and can be user edited and user adapted.

The subject facility can be one of an oil processing facility, a gas processing facility, an oil and gas separation facility, or a chemical processing facility.

In another embodiment, the invention is directed to a simulation modeler system that includes an input assembly that enables user specification of a subject facility design based on limited data, the subject facility design including design alternatives. The input assembly is responsive to the user specification, and forms therefrom an input data set configured for a simulation modeler requiring input beyond the limited data. The simulation modeler is coupled to receive the input data set from the input assembly and configured to execute in response to the input data set to model the subject facility design. The simulation modeler system further includes an interface member that enables the production of a rigorous simulation model of the subject facility design from the simulation modeler.

In yet another embodiment, the invention is directed to a computer-implemented (i.e., automated) method of designing a processing plant that includes receiving input of limited data of a subject facility design, the subject facility design including design alternatives, and using a processor routine to form from the limited data specifying the subject facility design an input data set to a rigorous simulation modeler that requires input beyond the limited data. The method further includes executing the simulation modeler using the formed input data set to produce a rigorous simulation model and outputting the simulation model to one of a computer display monitor, an output file or a combination thereof. Executing the simulation modeler can include a computer implemented selection of feasible design alternatives and corresponding process templates from a process template library. The method can further include revising the input data set by any one of defining a number of process trains, specifying preferred unit operations, specifying preferred types of equipment, specifying energy constraints, revising the ambient conditions, and revising the process utility specification, or any combination thereof.

This invention has many advantages, including a substantial reduction in the time required to create a rigorous process simulation of a process facility, thereby enabling many more design alternatives to be rigorously evaluated.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1E is a flow chart of the invention method for inputting feedstock pricing and editing prior input.

FIG. 2 is an illustration of a project information input screen according to an embodiment of this invention.

FIG. 6 is an illustration of input data of design preferences according to an embodiment of this invention.

DETAILED DESCRIPTION OF THE INVENTION

Figure 1A:
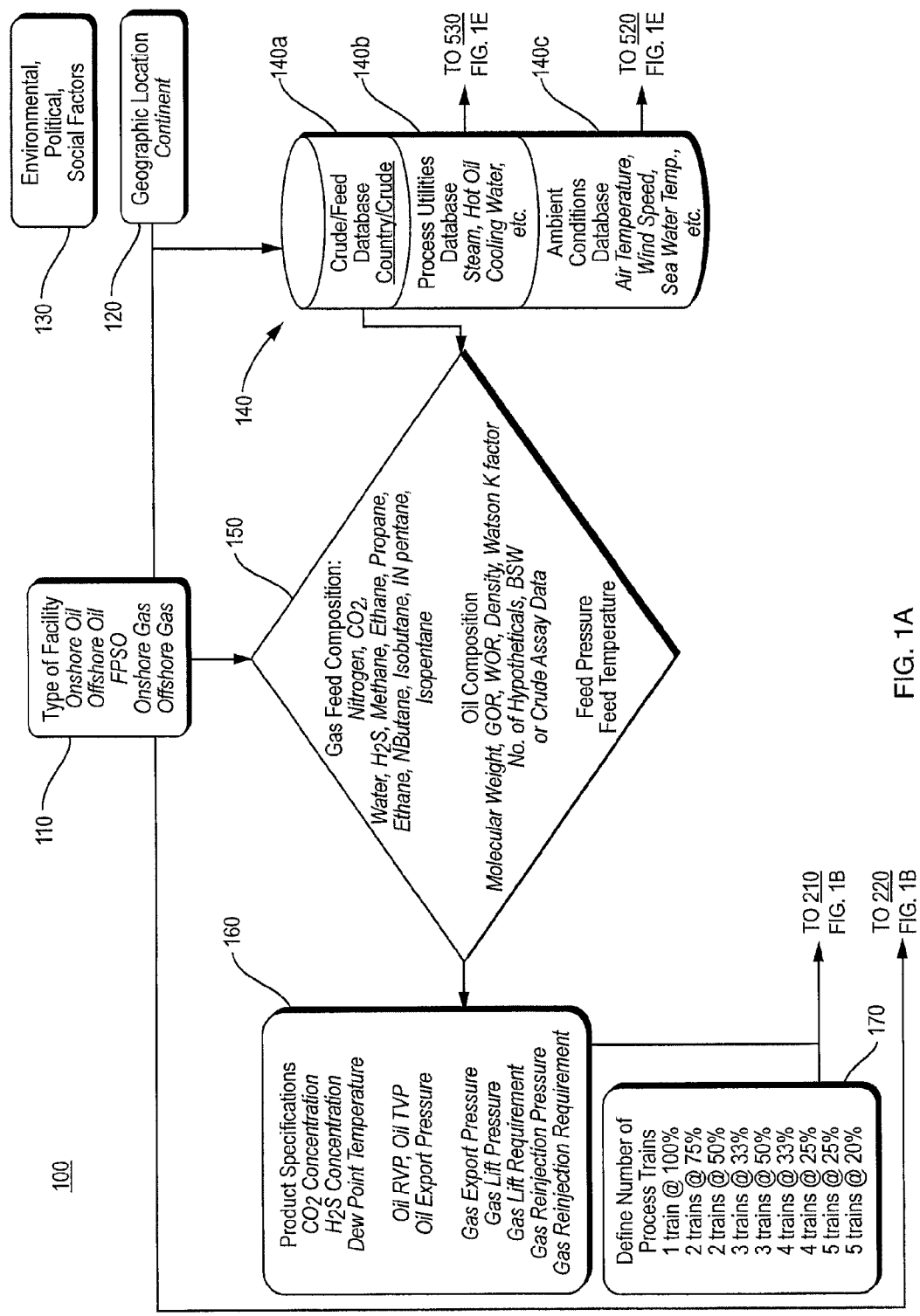
FIG. 1A is a flow chart of the invention method for processing project input and output specifications.

A description of an example embodiment of the invention illustrating the design of an oil and gas separation facility follows.

The conceptual design of an exploration and production (E&P) asset involves the development of many scenarios and options. This engineering process is known as field development or appraisal. Preliminary seismic data or well test data is used by the reservoir and geophysics groups to build a preliminary reservoir model which predicts the production rates of gas, oil, condensate, and water over the projected life of the field.

Due to the preliminary nature of the source data, a number of scenarios are generated and assigned with different probabilities (e.g., 10, 90, and 50%). These are called the P10, P90, and P50 cases. As will be made clearer below, probabilities are used to weigh investment risks, which in turn give rise to the need to model so many scenarios.

The appraisal and conceptual design group or field development teams are tasked with identifying the appropriate infrastructure and facilities to extract and process the hydrocarbons in accordance with the projected production rates, or achieving the best compromise in terms of capability and cost. The objective is to identify which of many potential opportunities around the globe should be pursued and have further time or financial investment committed to their development.

Economic decisions are taken by assessing the net present value over the projected life of the asset. For each of the potential extraction/field plans developed by the reservoir engineer and geophysics groups, there are many potential processing options available. These options will depend on the nature of the hydrocarbons in the asset, the existing infrastructure, and also on the company's expertise and best practices. Decisions will be taken on the type of platform, whether or not to use a floating production storage and offloading (FPSO) vessel, etc., and on how complex the processing scheme will be (e.g., maximize oil production, maximize natural gas liquids (NGL) production, minimize capital expenditure).

The options are ranked by technical feasibility and technical risk on the one hand, and commercial feasibility and commercial risk on the other. Sensitivity analysis is conducted on variables such as changes in oil or gas pricing, or changes in the gas-to-oil ratio. Due to the uncertainty in the feed material and in the quantity of reserves, there is typically a need to develop about 50 to 100 design cases.

A large amount of input data is needed to create a rigorous simulation model of an oil and gas separation facility. This input data is either known to the user of the simulator as a fact, or the user has to apply an engineering assumption based on experience or some industry or company guideline. The data that is typically entered in a rigorous simulation model includes, but is not limited to: compositions of all feed streams into the plant, conditions of all feed streams into the plant (flows, temperatures and pressures), ambient conditions of the location in which the plant is to be built (e.g., air temperatures, water temperatures, etc.), conditions of all process utilities that will be used in the plant (e.g., steam, hot oil, cooling water, etc.), specifications for the desired products of the plant, and any known constraints (e.g., emission limits for byproducts).

The user then has to select process equipment items (e.g., pumps, compressors, pipelines, separation vessels, distillations columns, absorber columns, mixers, and branches) and connect them together in an appropriate order for the plant to operate. The process simulation application (e.g., HYSYS® by assignee Aspen Technologies, Inc., Burlington, Mass.) will then calculate all the flows and conditions throughout the facility utilizing the fundamental principles of physics, chemistry, and mathematics to ensure that the design is practical and achievable. The process simulation application (process simulator) also typically calculates the mass and energy balance for the plant.

To create such a design requires many hours of work even for an experienced engineer. To help overcome the time constraints faced by the user of process simulation, most modern commercial process simulators (e.g., ProII by Invensys of Plano, Tex., Unisim by Honeywell of Phoenix, Ariz.) enable a user to save a template of a process or a sub-process which can be reused and edited by the user. This approach is typically used for sub-processes. For entire processes, there is usually substantial variation in conditions and constraints so that the use of templates becomes inefficient and an additional administrative burden.

The present invention also utilizes a library of templates for well defined industry processes and sub-processes, but overcomes the shortfalls described above by supplementing these templates with a set of rules built into an application. The rules are embodied in the application as a set of mathematical expressions and algorithms within the software code. The rules act in several ways:
  i) they interpret libraries of data (e.g., physical property data, geographic crude oil assay data, geographic ambient conditions data, process utility data, product specification data) and automatically complete the input data set, so that the user only has to input a fraction of the data normally required;
  ii) they interpret the completed input data set to determine the configuration of the plant required to process the plant feed streams so as to comply with the desired product specification;
  iii) they generate key sub-processes by connecting process equipment items and streams to generate templates;
  iv) they extract templates from a library of sub-processes according to the required configuration; and
  v) they connect the templates retrieved from the library together with those generated by prior rules (e.g., templates generated by iii) above).

Once the rules have been applied in their entirety, or the user completes (or edits) the input data set as needed, the result is a rigorous simulation model of the oil and gas separation facility within the process simulator. A rigorous simulation model is a model-based representation of a chemical, physical process and its associated unit operations within a software application. The simulation model, or process simulation, includes a thorough knowledge of chemical and physical properties of pure components and mixtures, of chemical reactions, and of mathematical models which, in combination, enable the calculation of a process in the computer application. A process simulation application includes detailed non-linear representations of process equipment items such as pumps, heat exchangers, distillation columns, and pipelines.

Process simulation software applications use flowsheets to describe where unit operations are positioned and connected by feed and product streams. The software solves the mass and energy balance to find a stable operating point or design. The goal of a process simulation is to find the optimal conditions for the process. The user can then interact with the process simulation as they normally would. Key engineering parameters of the rules are exposed to the user in such a way that they can be edited and saved as a preference file. This enables the user to adapt to changes over time in engineering practice, or to changes in product specifications, or to apply different criteria for different projects.

The rules for the auto generation of input data, pre-screening and determination of feasible plant configurations, the auto generation of sub-processes, and the auto assembly of template libraries are illustrated in the flow charts shown in FIGS. 1A-F.

As shown in FIG. 1A, project input and output specifications 100 includes step 110 where the user inputs or otherwise designates the type of facility, such as onshore oil, offshore oil, a floating production storage and offloading (FPSO) vessel, or an onshore or offshore gas facility. Optionally, the user can input in step 120 a geographic location, such as a continent, and in step 130, the user can input environmental, political, or social factors, such as a facility close to habitation or an environmentally sensitive area. The inputs are complemented by a database or preference file 140 including a crude or feed database 140a that supplies crude oil properties/specification depending on the country and reservoir. Database 140 includes a process utilities database 140b, including such process utilities as high pressure steam, medium pressure steam, low pressure steam, hot oil, cooling water, air, refrigerant, etc., and an ambient conditions database 140c, such as air temperature, wind speed, and sea water temperature. This data is used for engineering constraints for design of heat exchangers and other equipment embedded in the process templates. Database 140 selects an appropriate list of chemical components for the type of crude oil asset specified from the feedstock database 140a, and also selects an appropriate list of utilities from the process utilities database 140b.

In rule 150, for an oil and gas separation process, the chemical component list includes the gas feed composition including nitrogen, carbon dioxide, water, hydrogen sulfide, methane, ethane, propane, butane, iso-butane, pentane, iso-pentane and the oil composition which is defined by specifying the molecular weight, gas-to-oil ratio (GOR), water-to-oil ratio (WOR), density, Watson K factor, the number of hypothetical components used to represent crude oil, the specification for the bulk solids concentration in the produced water stream (BSW), and the feed pressure. For the Watson K factor, see API Technical Data Book, Chapter 2: *Characterization of Hydrocarbons*, $5^{th}$ Ed. 1992.

At step 160, the user inputs the desired product specifications, including the carbon dioxide concentration, hydrogen sulfide concentration, dew point temperature, oil Reid vapor pressure (absolute oil vapor pressure at 100° F.), oil true vapor pressure, oil export pressure, gas export pressure, gas lift pressure and gas lift requirement, gas re-injection pressure and the gas re-injection requirement. At step 170, the user inputs the number of process trains desired, such as, for example, one train at 100%, or two trains at 50% each, or four trains at 25% each, etc.

Figure 1B:
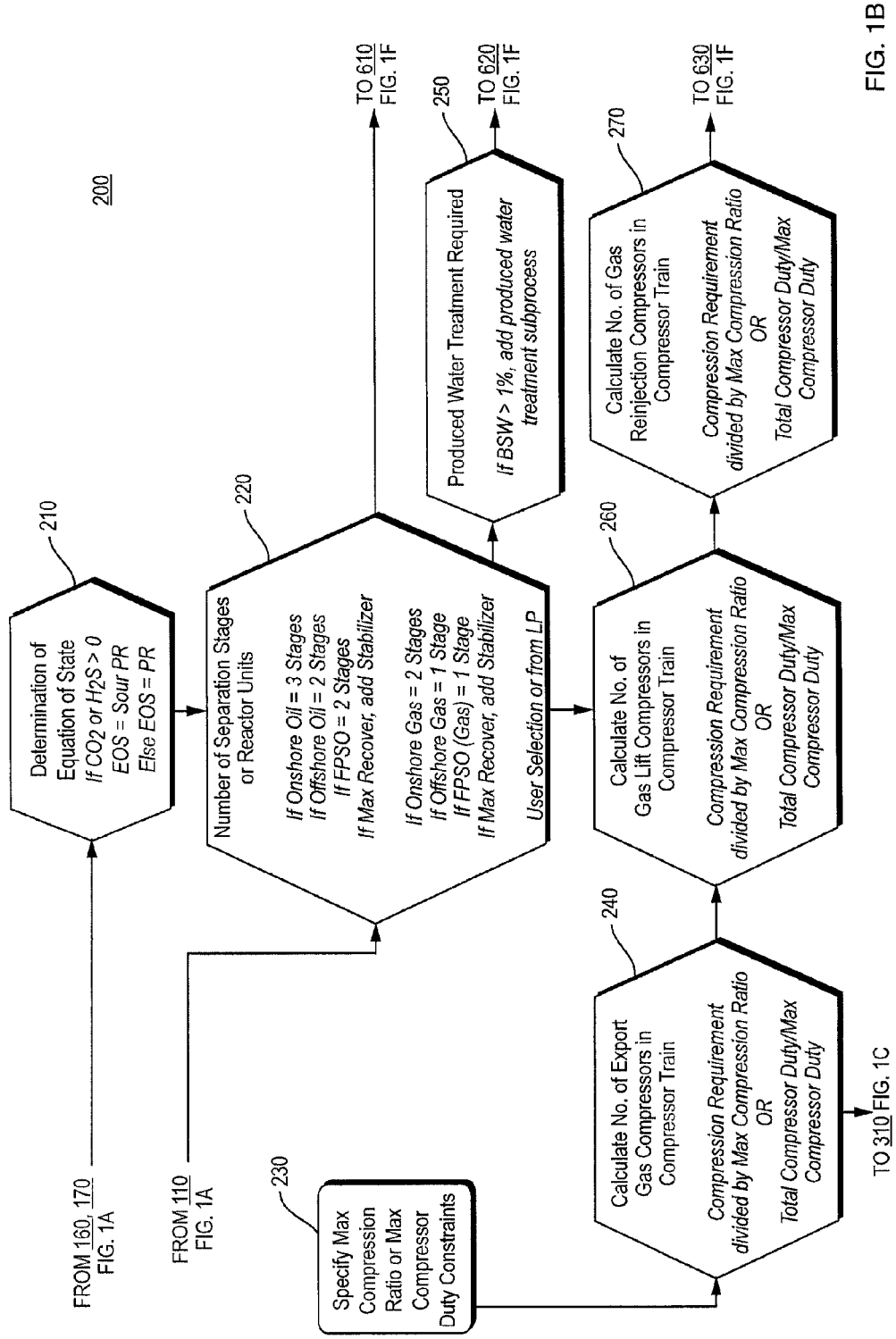
FIG. 1B is a flow chart of the invention method for processing industry best practices and company standard procedures.

Flow sheet 200, shown in FIG. 1B, adds several industry best practices and company standard procedures. Rule 210 determines the operating temperature and pressure of the feed gas and the presence of certain chemical species, such as hydrogen sulfide, and selects the appropriate equation of state for the overall process. Various equations of state are known to those of ordinary skill in the art. Typically, for an oil and gas facility, the Peng-Robinson equation of state (EOS) is selected. If an acid gas, such as, for example, hydrogen sulfide, is detected, then, optionally, a sour Peng-Robinson equation of state can be selected. The Peng-Robinson model is preferred for vapor liquid equilibrium (VLE) calculations, as well as for calculating liquid densities for hydrocarbon systems. The Peng-Robinson property package rigorously solves any single-, two-, or three-phase system with a high degree of efficiency and reliability, and is applicable over a wide range of conditions, such as, for example, a temperature greater than −271° C., and a pressure lower than 15,000 PSIA. The Peng-Robinson property package also contains enhanced binary interaction parameters for all library hydrocarbon-hydrocarbon pairs (a combination of fitted and generated interaction parameters), as well as for most non-hydrocarbon binaries. For non-library or hydrocarbon hypocomponents, interaction parameters are generated automatically by HYSYS for improved VLE property predictions. The Peng-Robinson equation of state is also the generally recommended property package for petrochemical applications. The Peng-Robinson property package is generally used for the following: triethylene glycol (TEG) dehydration, TEG dehydration with aromatics, cryogenic gas processing, air separation, atmospheric crude towers, vacuum towers, high hydrogen systems, reservoir systems, hydrate inhibition, and crude systems.

The sour Peng-Robinson model combines the Peng-Robinson equation of state with Wilson's API-Sour model for handling sour water systems, and can be applied to sour water strippers, hydrotreater loops, crude oil columns, or any process containing hydrocarbons, acid gases, and water. In the sour Peng-Robinson model, the K values for the aqueous phase are calculated using Wilson's API-Sour method. This option uses Wilson's model to account for the ionization of the hydrogen sulfide, carbon dioxide and ammonia in the aqueous phase. The aqueous model employs a modification of Van Krevelen's model with some of the key limitations removed. The K value of water is calculated using an empirical equation, which is a function only of temperature. The original model is applicable for temperatures between about 20° C. and about 140° C. and pressures up to about 50 psi. Use of the Peng-Robinson equation of state to correct vapor phase non-idealities extends this range, but due to lack of experimental data, exact ranges cannot be specified. The acceptable pressure ranges for the HYSYS model vary depending upon the concentration of acid gases and water. The method performs well when the water partial pressure is below about 100 psi.

The number of separation stages is determined in rule 220. The recommended defaults are as follows: for an on-shore oil facility, three stages of separation, for an off-shore oil facility, two stages are recommended, and for a floating production and storage and offloading vessel, two stages of separation are recommended. If maximum recovery is desired, then the separation stages are complemented with a stabilizer column. For an offshore gas production facility, one stage of separation is recommended, and for onshore gas production, two stages are recommended, and for a FPSO, one stage of separation is recommended, with the addition of a stabilizer column if maximum recovery is desired. Rule 220 determines the operating pressure and temperature of the feed stream and the number of physical states present in the feed: solid phase, liquid (hydrocarbon) phase, liquid (aqueous) phase, and gas. Rule 220 also determines the corresponding number of product streams required to meet the outlet specifications (together with the specified quality of those product streams). The product streams for an oil and gas separation facility are export oil, export oil and water, produced water, export gas, lift gas, and re-injection gas. Rule 220 then selects the appropriate template of the separation sub-process and populates the template with input data.

Rule 220 can be overruled by the user, who can specify the number of stages, or whether or not to include a stabilizer column. In that case, a predefined template of the appropriate separation sub-process is selected and populated with input data. The oil export specification determines if the export oil stream complies with the user-defined Reid vapor pressure and true vapor pressure specifications. If the export oil vapor pressure is above the specified limit, the application automatically generates a stabilizer column and associated process equipment, embeds them within the separation sub-process template at the appropriate location, and populates the template with input data.

In step 230, the user specifies either the maximum compression ratio or the maximum compressor duty desired. Rule 240 then determines the outlet pressure of the separated gas and the desired pressure for export of the gas product stream. Rule 240 determines the number of compressors required in series to achieve the desired export pressure by applying a maximum allowable compression ratio or a maximum allowable compressor power specified by the user. A default number is offered by the application as a guide. Rule 240 then automatically generates a sub-process with the appropriate number of compressors and connecting streams, interstage coolers, and liquid knock out vessels. The pressure levels for the individual compressors are set and other sub-processes are populated with input data.

Rule 250 determines the presence of solids in the produced water stream and the concentration of hydrocarbons. If the solids concentration is above the user specified limit set by rule 150 (FIG. 1A), a template for a produced water treatment sub-process is selected and populated with input data. If the concentration of hydrocarbons in produced water is greater than a user specified limit, then a hydrocarbon recovery unit is automatically added to the produced water treatment sub-process template and populated with input data.

Rule 260 determines if gas lift has been specified by the user and the quantity and pressure of gas lift required. Rule 260 applies similar criteria as compression rule 240 to create a gas lift compression sub-process. The gas lift sub-process is connected via a branch to the outlet of the gas dehydration sub-process.

Rule 270 determines if re-injection gas has been specified by the user and the quantity and pressure of re-injection gas required. Rule 270 applies similar criteria as defined in the compression rule 240 to create a re-injection gas compression sub-process. The re-injection gas compression sub-process is connected via a branch to the outlet of the gas dehydration sub-process.

Figure 1C:
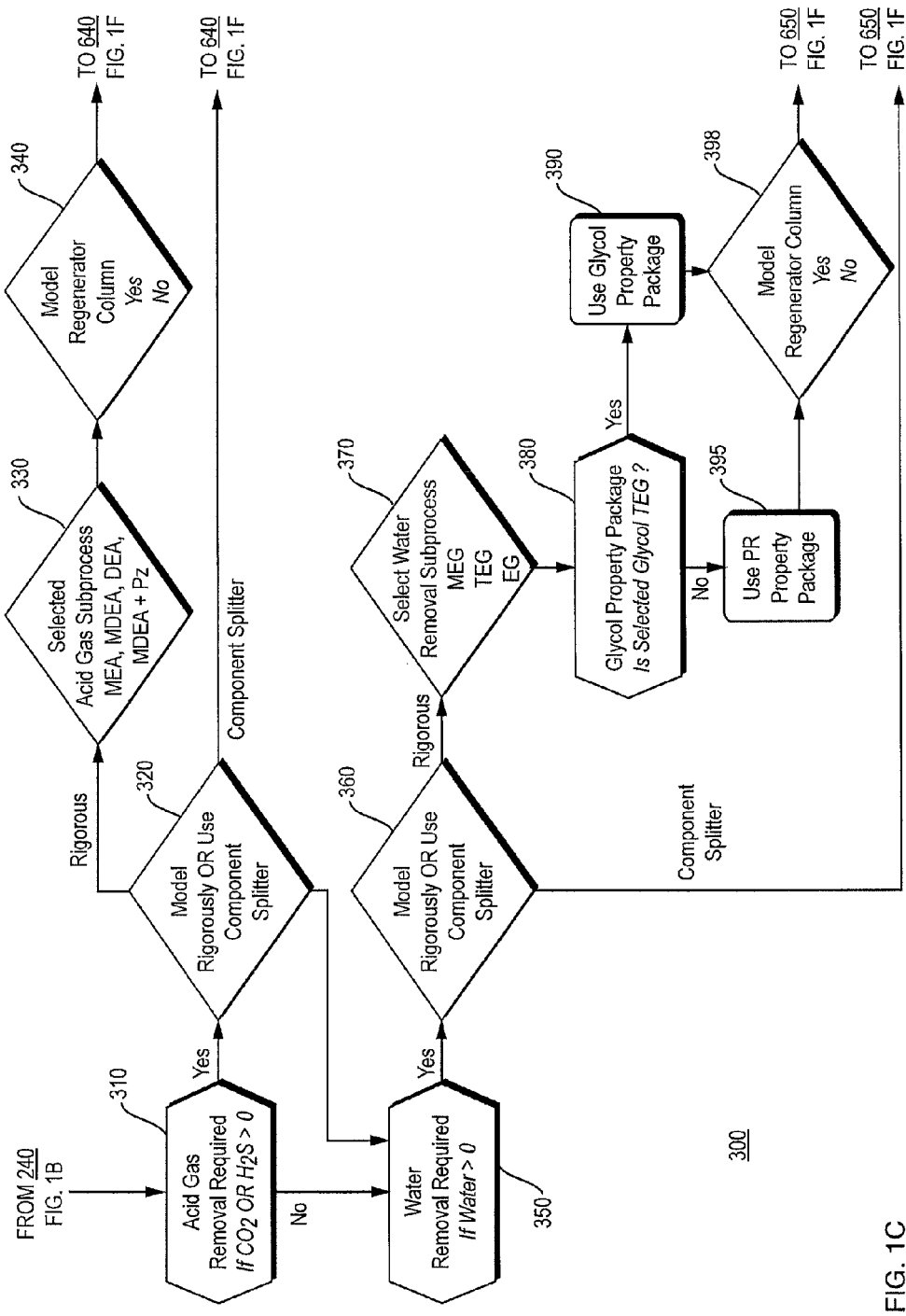
FIG. 1C is a flow chart of the invention method for sub-process generation.

In sub-process generation flow sheet 300, shown in FIG. 1C, rule 310 determines if acid gases are present in the feed stream in sufficient concentrations (e.g., $CO_2$ or $H_2S$>5 ppm) such that the plant will not comply with the product specification, or will jeopardize the mechanical integrity of the plant via corrosion. For an oil and gas facility, acid gases are considered present if the concentration of carbon dioxide or hydrogen sulfide is greater than about 5 ppm. If the feed (inlet) concentration is lower than the outlet specification, then no acid gas treatment is implemented. The user defines the allowable specification of acid gas in the product specification step 160 (FIG. 1A) and selects the preferred treatment method from a library of options (process utilities database 140b). Step 320 determines whether acid gas removal is to be modeled rigorously or whether the use of a component splitter is desired. A component splitter enables the user to simply specify the outlet specification of acid gas for the output, whereas rule 330 allows the user to rigorously model acid gas removal by an acid gas sub-process based on a choice of acid gas removal compounds, such as, for example, monoethanolamine (MEA), methyl-diethanol-amine (MDEA), diethylamine (DEA), and MDEA+Piperazine (MDEA+Pz). For a rigorously modeled acid gas sub-process, the user can also specify in rule 340 an acid gas regenerator column.

Rule 350 determines if water is present in the feed stream in sufficient concentrations such that the plant will not comply with the product specification or the water will jeopardize the mechanical integrity of the plant by corrosion. For an oil and gas facility, the rule applies if the water concentration in the feed stream is greater than 0%. Rule 350 also determines whether an acid gas removal sub-process has been selected by the application in rule 310, because acid gas removal would reintroduce water into the process. The user defines the allowable specification of water in the product specification (step 160, FIG. 1A) and the preferred water removal method from a library of options. Rule 360 then selects the appropriate template for the water removal sub-process and populates it with input data. Rule 360 also determines whether water removal is to be modeled rigorously, or whether to use a component splitter, which just determines what the desired concentration of water in the output should be, in a similar manner to rule 320.

By contrast, for a rigorous removal model, rule 370 selects the water removal sub-process, such as, for example, methylethyl glycol (MEG), triethylene glycol (TEG), or ethylene glycol (EG). If a water removal process has been identified as necessary, and a preferred sub-process has been selected by the user in rule 370, then rule 380 determines if a specific glycol property package 390 is required for that sub-process and implements it in the sub-process. Otherwise, a Peng-Robinson property package 395 is used. In either case, if a glycol property package has been selected, rule 398 determines whether a water remover regenerator column is implemented.

Figure 1D:
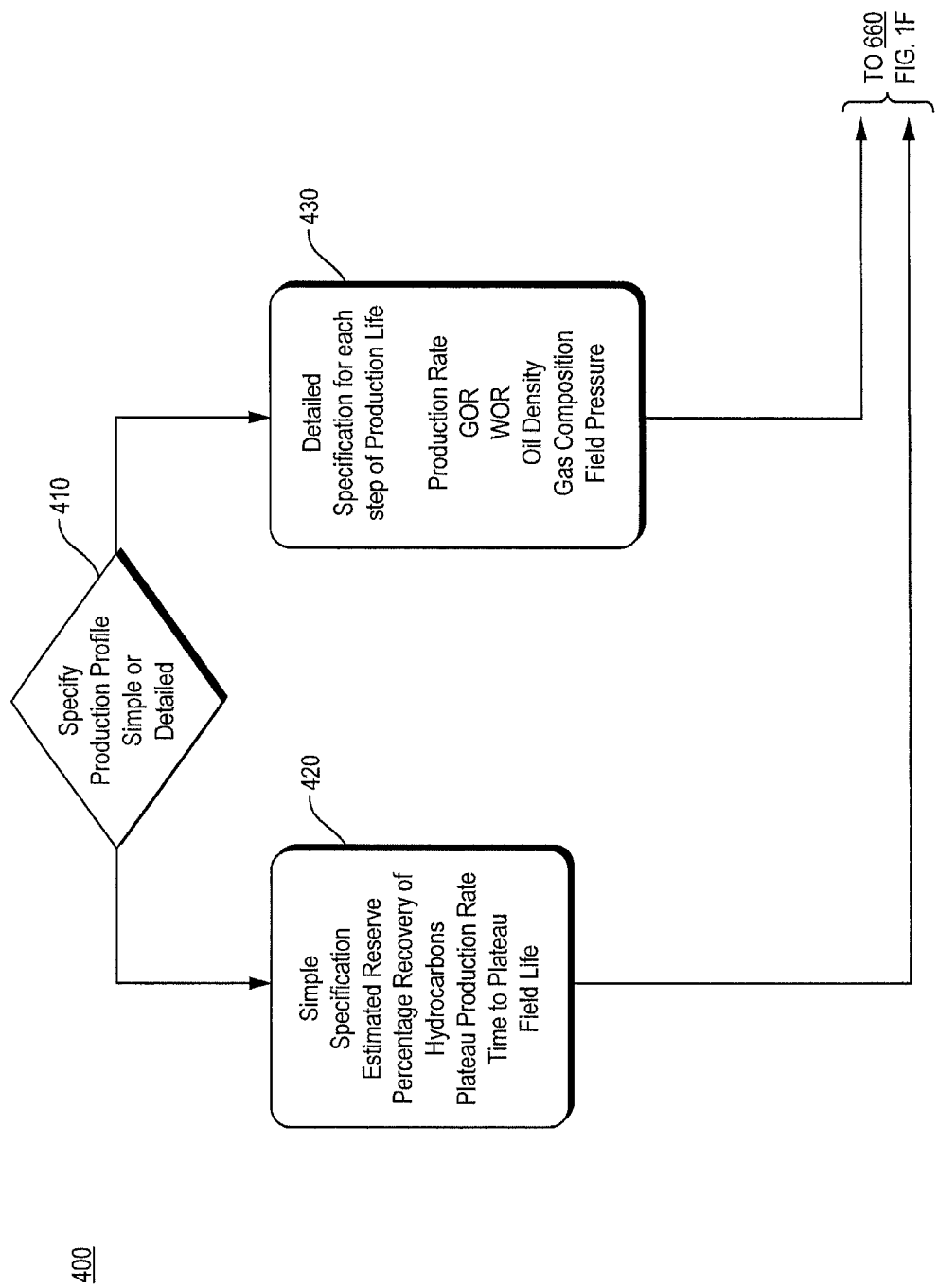
FIG. 1D is a flow chart of the invention method for inputting a production profile.

In flow sheet 400, shown in FIG. 1D, the user specifies the production profile. Rule 410 determines whether the production is simple or detailed. For a simple production profile, the user inputs in step 420 the estimated reserves, the percentage recovery of hydrocarbons, the plateau production rate, the time to plateau, and the field life. For a detailed production profile, in step 430, the user inputs, for each step in the production life, the production rate, the gas-to-oil ratio (GOR), the water-to-oil ratio (WOR), the oil density, gas composition, and field pressure. If the user has entered a detailed production profile, the application automatically creates a series of flow sheets to represent the behavior of the asset in accordance with rule 430. These flow sheets represent the plant at the different flow rates, conditions, and specifications anticipated over the operational life of the asset. These individual flow sheets are saved as separate case files for later evaluation.

In flow sheet 500, shown in FIG. 1E, the user inputs, in step 510, the feed stock or product pricing such as, for example, the cost-per-barrel of oil and/or the cost-per-mole of gas. In step 520, the user can also accept or edit the ambient conditions obtained from database 140c. In step 530, the user can accept or edit the process utility specifications database 140b (FIG. 1A).

Figure 1F:
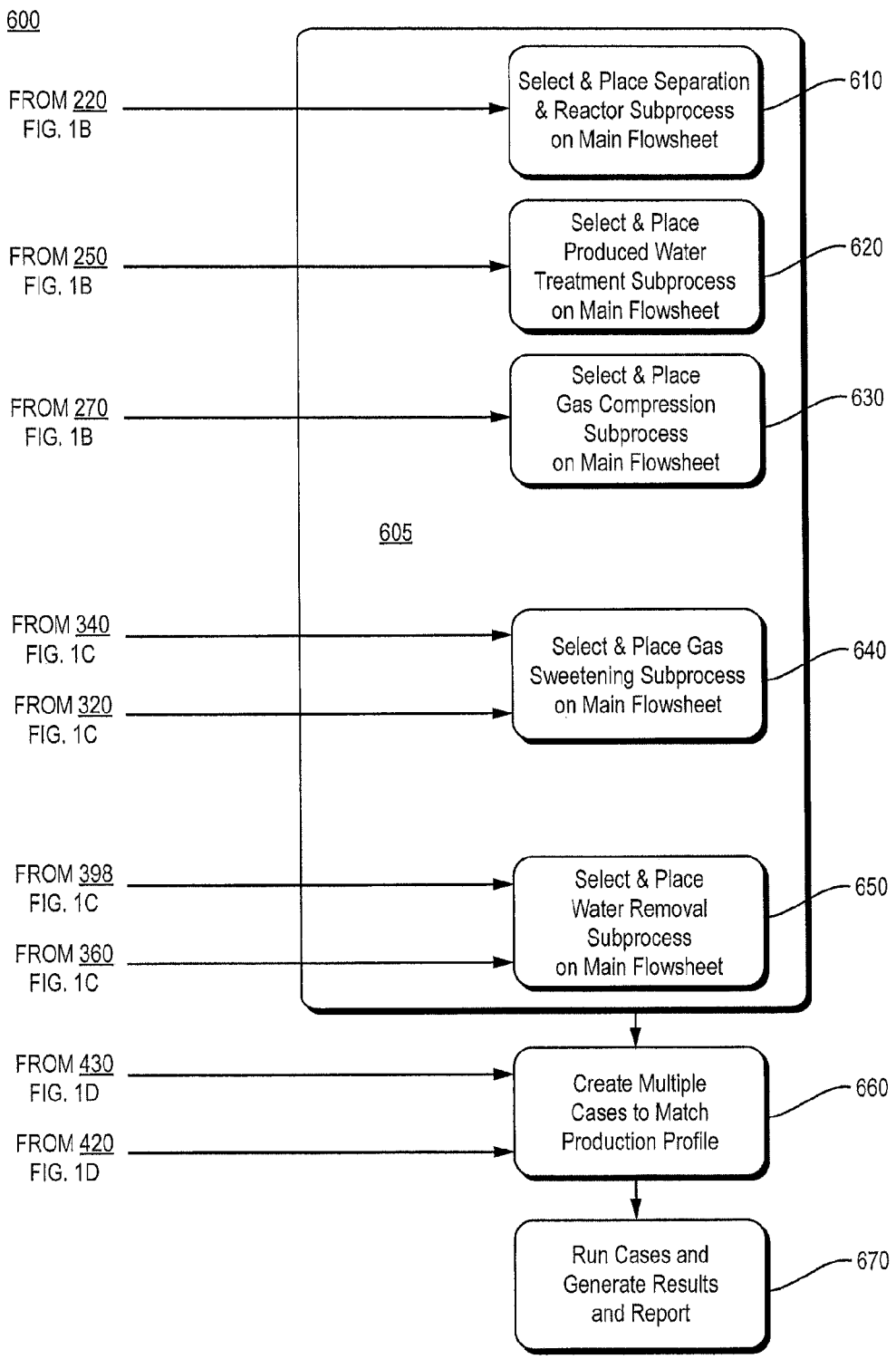
FIG. 1F is a flow chart of the invention method for main flow sheet generation.

In main flow sheet generation 600, shown in FIG. 1F, the application selects and places the following sub-processes on the main flow sheet 605: in step 610 the separation sub-process 220, in step 620, the produced water treatment sub-process from step 250, in step 630, the gas compression sub-processes from step 270, in step 640, the acid gas sub-process from step 320, and in step 650, the water removal sub-process from step 360. The application then in step 660 creates multiple cases to match the production profile specified in flow sheet 400, and in step 670, runs the cases, generating the results and the report.

The produced simulation model is extensible to any process plant configuration by the inclusion of additional rule sets and process templates. As described above, the configuration engine is built upon a series of templates of typical exploration and production processes, sub-processes, and unit operations. In addition, there are a series of design rules and methods that would be used to create parts of the overall flowsheet and to link the templates in a meaningful and robust manner. The user is guided through the workflow in a structured way using a wizard methodology such as illustrated in FIGS. 2-7. The graphical user interface, screen views, tabs and fields illustrated in FIGS. 2-7 are but one embodiment of many in the purview of the skilled artisan given this description.

Figure 2:
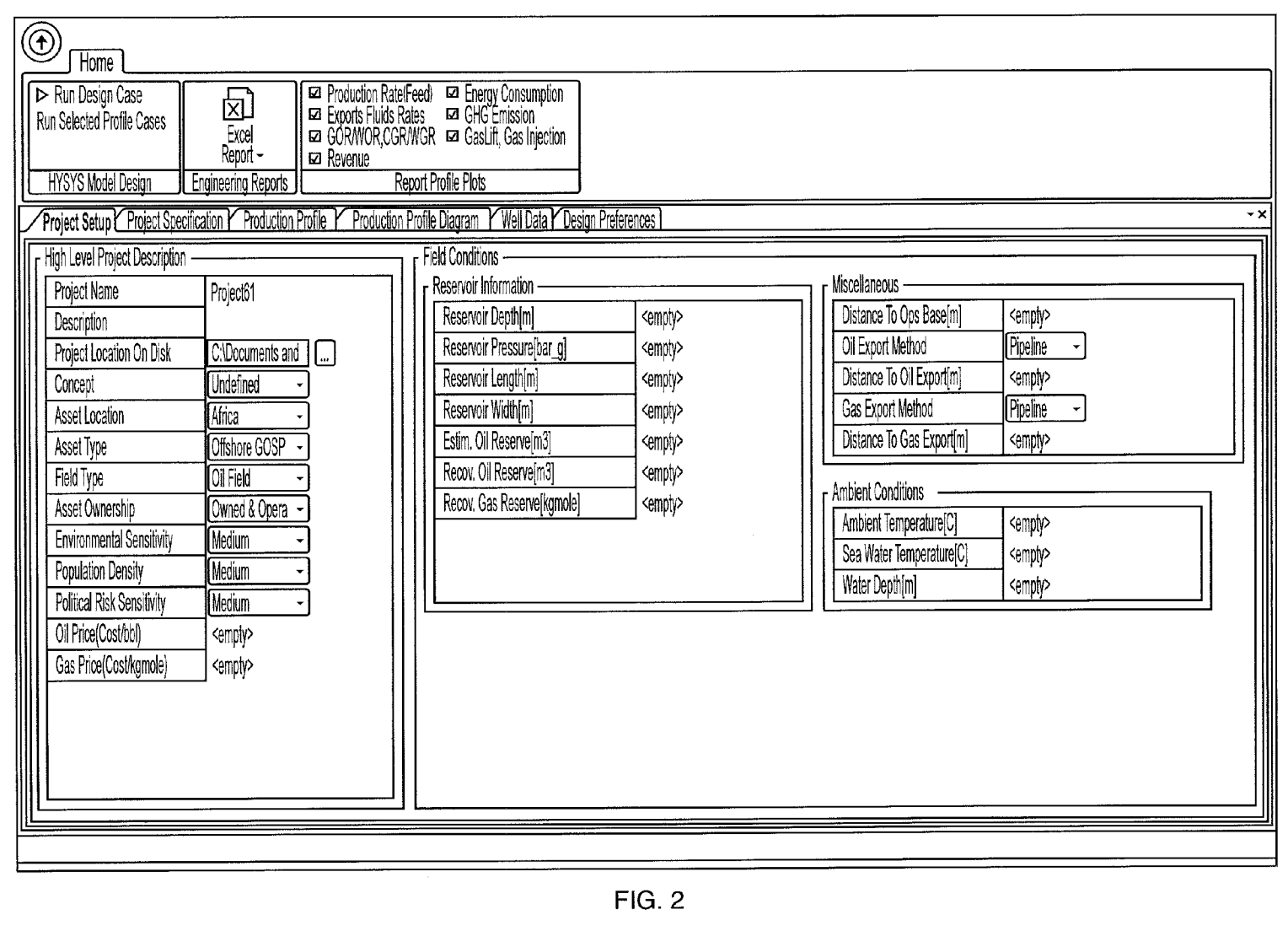

As shown in FIG. 2, the user enters the project information specifications 100 (e.g., 110, 120, 130 of FIG. 1A):
  a. project name (mandatory)
  b. project number or other identifier (optional)
  c. description (optional)
  d. geographic location (optional)
  e. political environment (optional)
  f. human environment (close to habitation/environmental sensitive area) (optional)
  g. project oil & gas prices (optional)
  h. ambient temperatures (optional)
  i. sea water temperatures (optional)
  j. reservoir information (optional):
    i. depth
    ii. length
    iii. width
    iv. pressure
    v. temperature
    vi. estimated oil and gas reserves
  k. information relating to the type and nature of the oil/gas export (optional).

As indicated above, most of this information is not required to create the design, but it provides the context of the development and may be used in the overall decision making process. The user identifies the project directory where cases are to be saved, and the application saves different cases to that directory using a predetermined naming convention based on the project name.

Figure 3A:
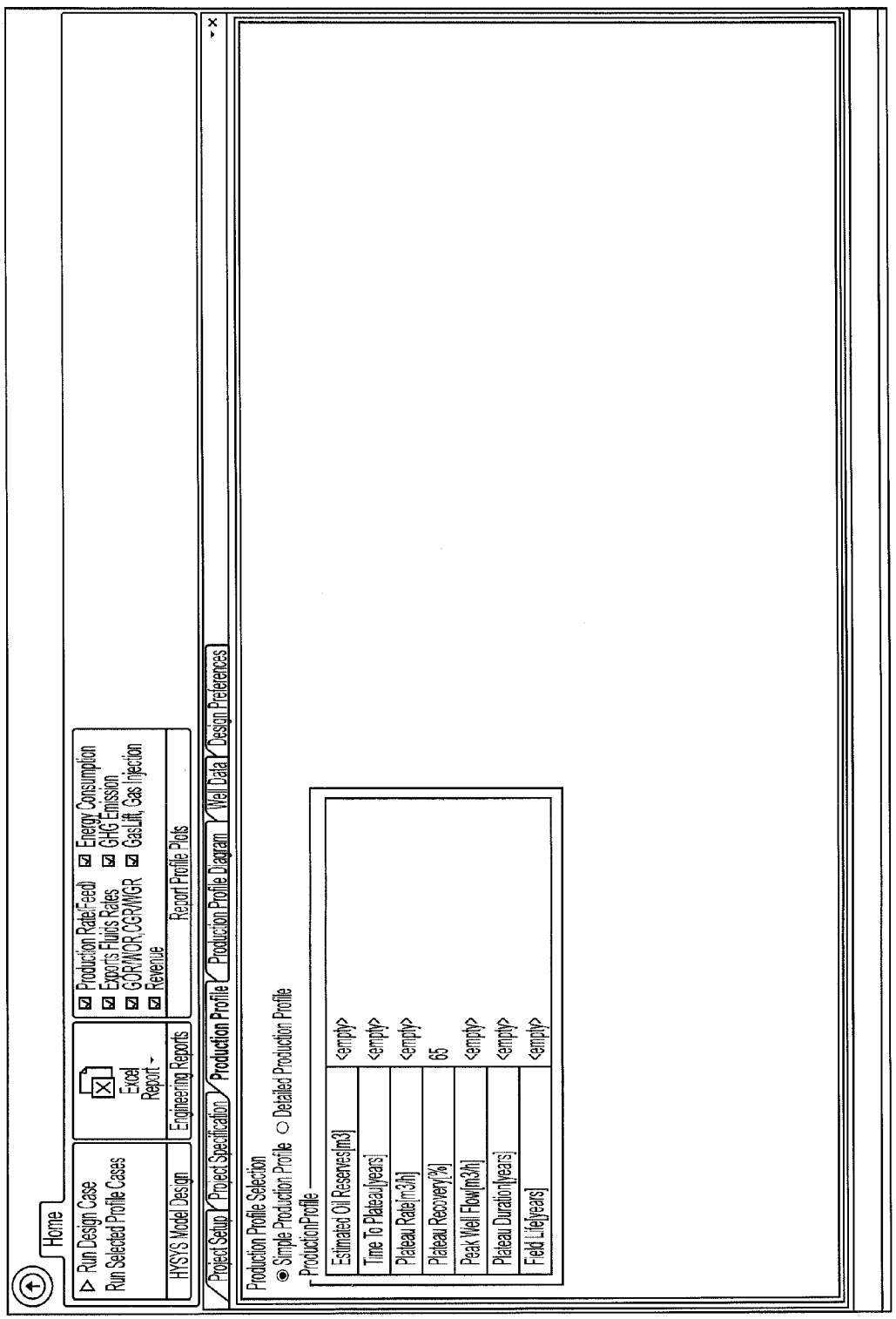
FIG. 3A is an illustration of simple production profile input data according to an embodiment of this invention.
Figure 3B:
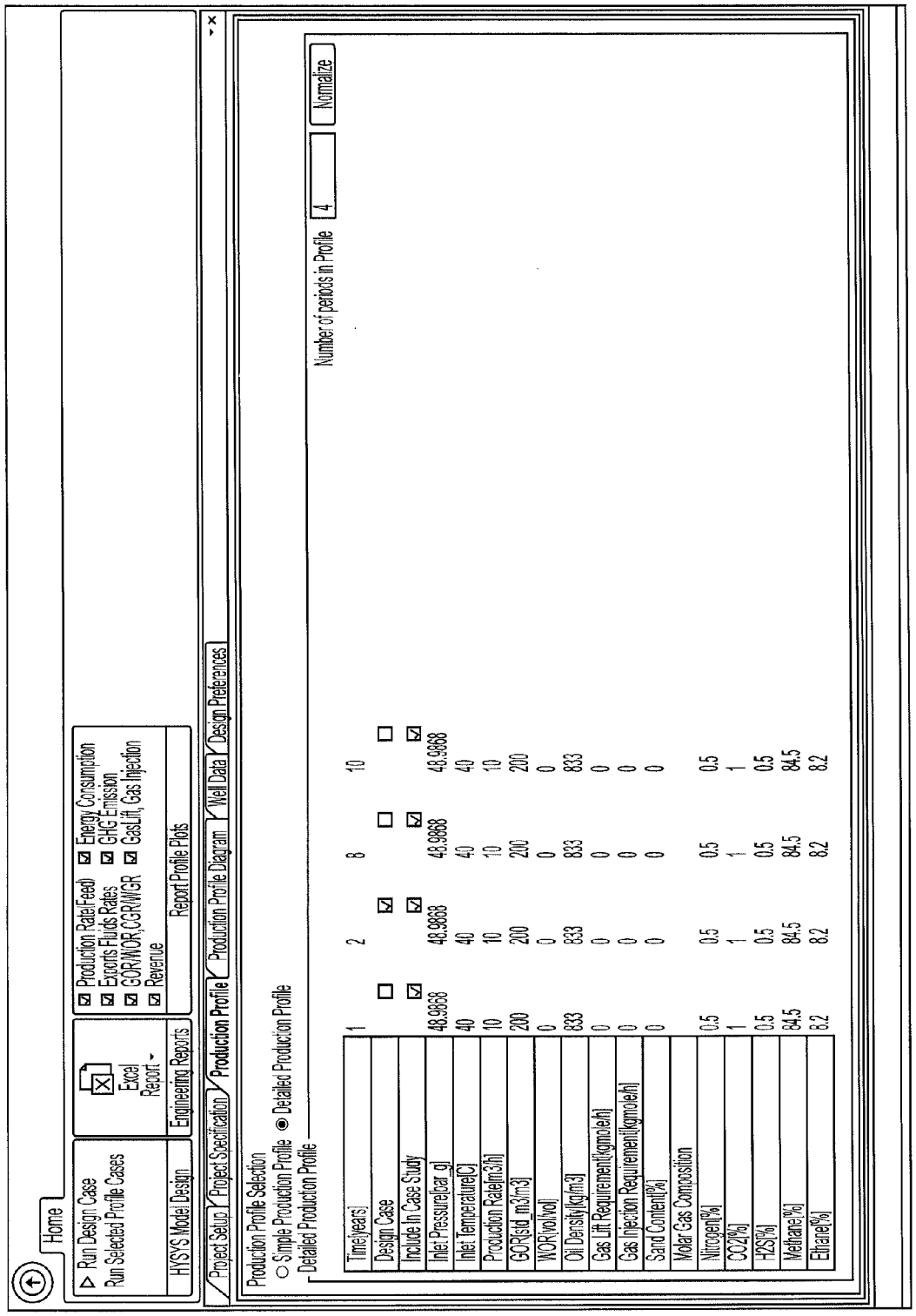
FIG. 3B is an illustration of detailed production profile input data according to an embodiment of this invention.
Figure 4:
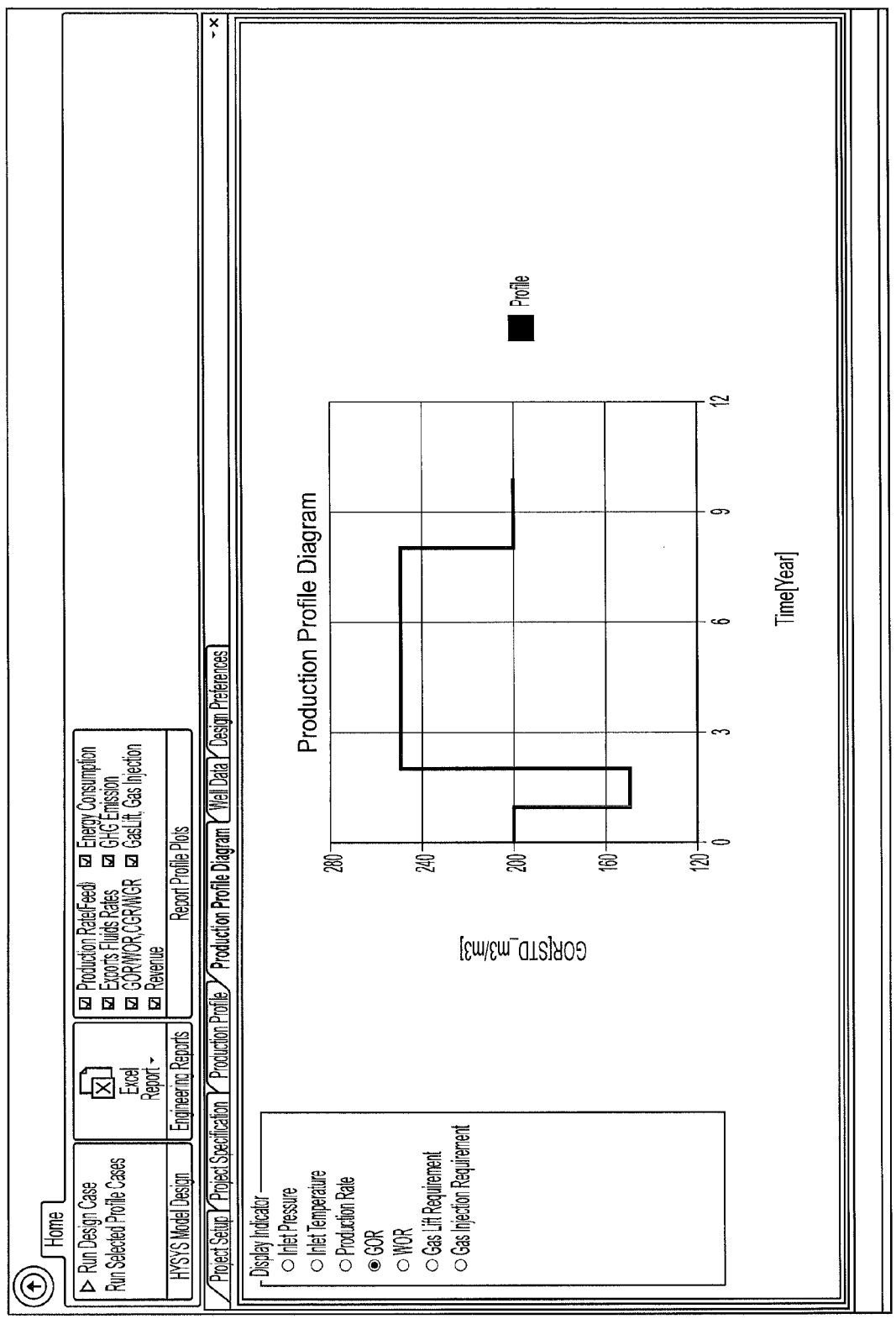
FIG. 4 is an illustration of gas-to-oil ratio (GOR) production profile resulting from input data shown in FIG. 3B.

In the production profile tabs (screen views) of FIGS. 3A, 3B, and 4, the user next enters the production profile for the field (following flow sheet 400 of FIG. 1D). There are two choices for the user: a simple production profile, shown in FIG. 3A, or a detailed production profile, shown in FIG. 3B. For a simple production profile, the user specifies the plateau production rate, the field recovery factor, and the life of the field, from which the profile graph is generated. For a simple production profile, in one embodiment, only one case is created by the application. This case represents the behavior of the facility at the plateau production rate. It is expected that a simple production profile is utilized at the very preliminary stages of such assessments.

If the user inputs a detailed production profile, such as illustrated by FIG. 3B, then a much more rigorous analysis is possible. This option enables the user to create a detailed production profile by entering flow, pressure, and composition data for the feed at different time periods in the production of the field. The user can then select any of these scenarios as the design case for the project, and can identify which scenarios should be included in a series of predetermined case studies. These predetermined case studies show the revenue profile over the life of the field and other important criteria such the energy consumption, fuel gas requirement, and the carbon dioxide emissions over the life of the field. The user has the option to save each scenario in the case study as a separate HYSYS case for further analysis and development and to export predetermined design details from the case to an electronic spreadsheet (e.g., Excel) for case comparison purposes.

For a detailed production profile diagram, an example of which is shown in FIG. 4, depending on the available data, the user can enter the feed specification either manually, or by importing a stream from another simulation. Based on the location selected in the project setup, the user may be offered a set of default values based on a simple crude oil database. If the user wants to overwrite the suggested values, the user can enter basic data on the oil molecular weight and density, together with the gas-to-oil ratio and water-to-oil ratio. The gas composition is entered for hydrocarbons, methane, ethane, propane, iso-butane, n-butane, iso-pentane, plus nitrogen, carbon dioxide and hydrogen sulfide.

Figure 5:
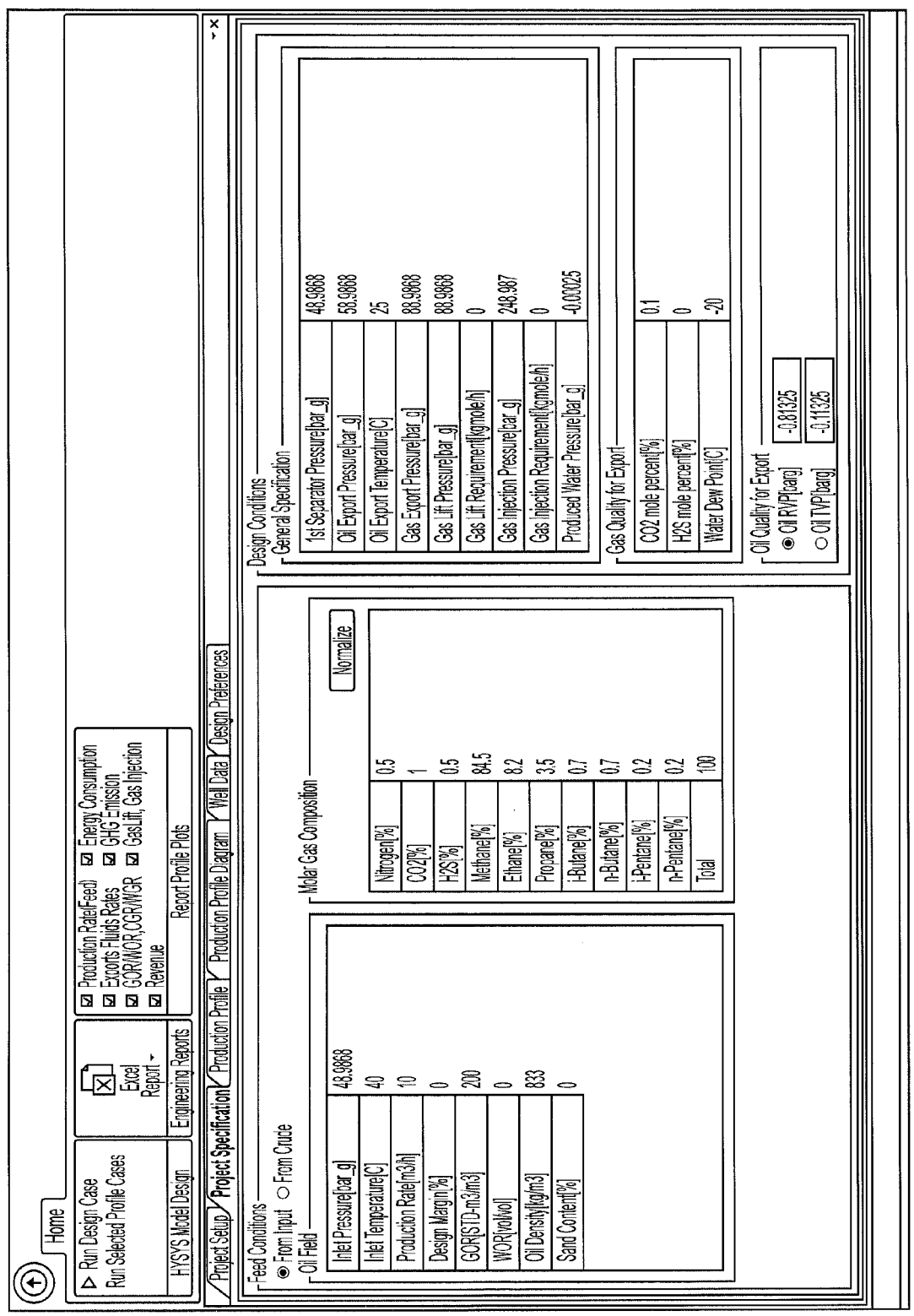
FIG. 5 is an illustration of input data of feed and product specifications according to an embodiment of this invention.

As shown in FIG. 5, the user then inputs basic product outlet specifications 100 (i.e. 160 of FIG. 1A):
 a. oil Reid vapor pressure/true vapor pressure
 b. gas export pressure
 c. gas re-injection pressure
 d. quantity of gas lift required
 e. dew point specification for export gas
 f. oil export temperature and pressure
 g. carbon dioxide concentration, and
 h. hydrogen sulfide concentration.

Figure 6:
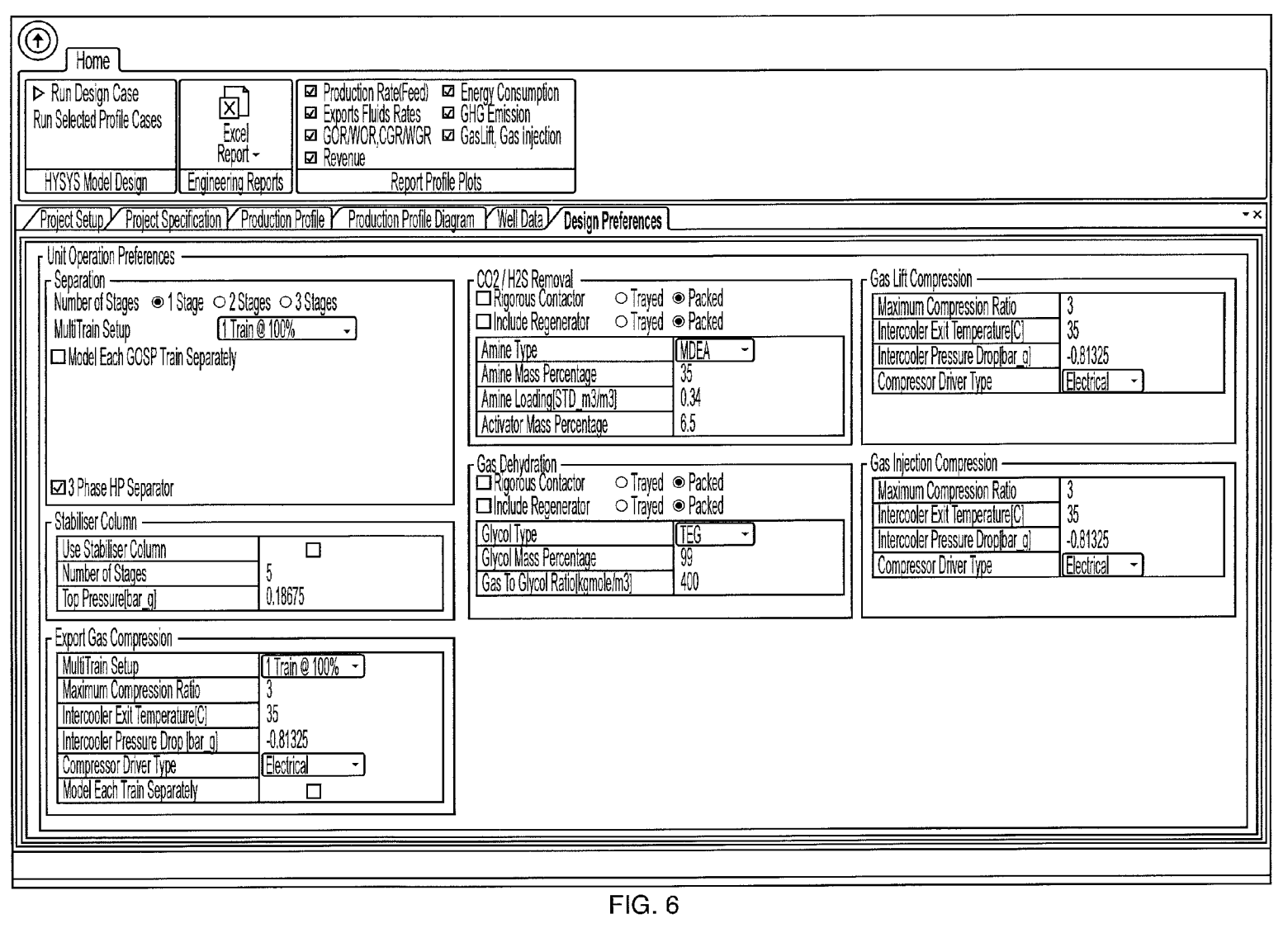

As shown in FIG. 6, the user then inputs some company/project defaults about the rigor of the simulation/estimate/reporting requirements, for example:
 a. gas sweetening as a component splitter or modeled rigorously,
 b. gas sweetening to include amine regeneration column (optional),
 c. dehydration-use a simplistic or rigorous model, and
 d. dehydration to include glycol regeneration column (optional).

As also shown in FIG. 6, the user then determines the design philosophy with regard to the number of parallel processing trains, for pressure let down (separation) and gas compression (electric or gas turbine).

Figure 7:
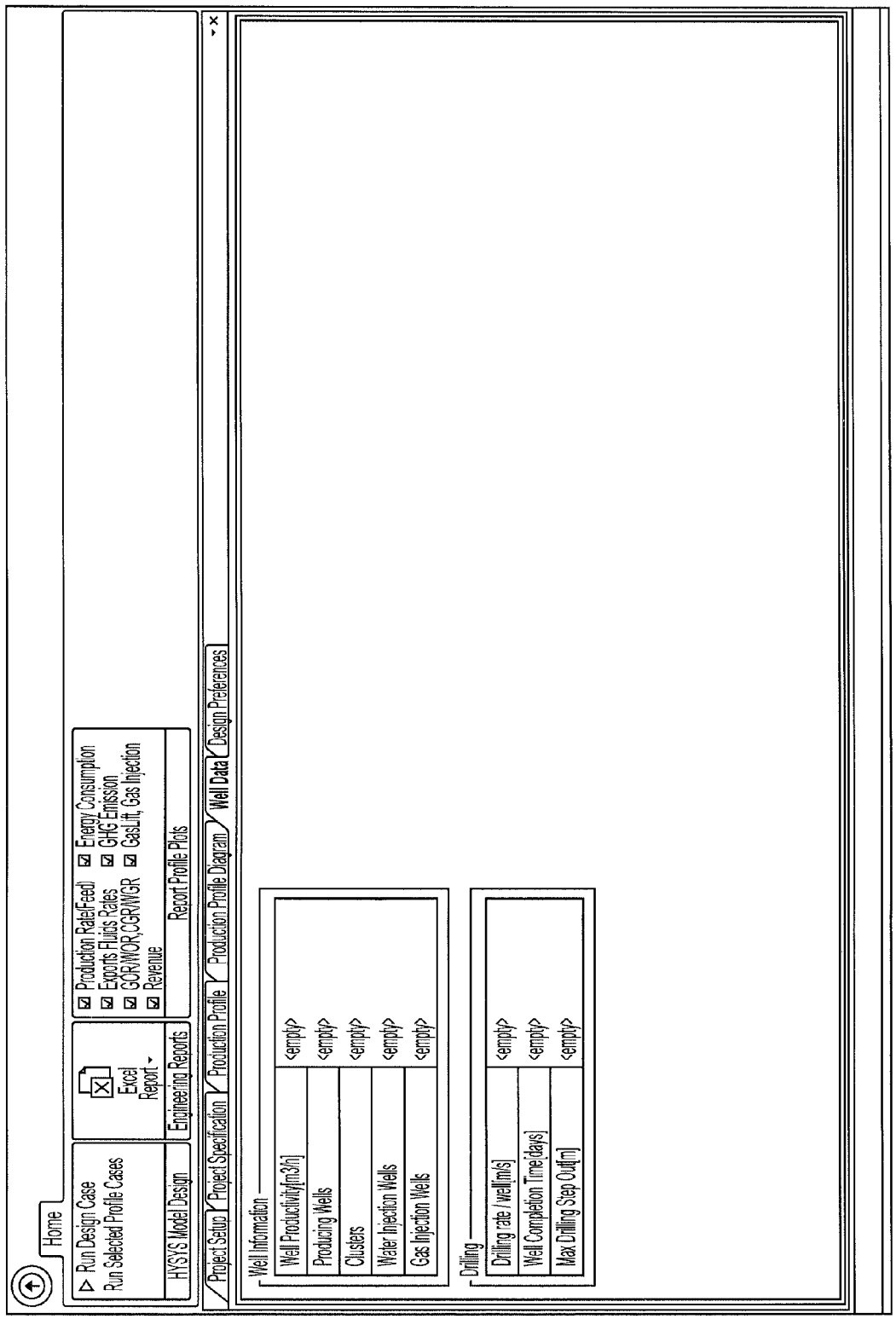
FIG. 7 is an illustration of the build and reporting control window according to an embodiment of this invention.

As shown in FIG. 7, the user then selects a button (operation) to auto-generate the design case. On completion of the design case, the user can then run the different options for case studies, and auto-generate case files and Excel reports for the different scenarios in the production profile. Each rigorous simulation (HYSYS) case generated may be solved, converged, and saved according to a defined naming convention into a project directory. The detailed production profile can also be utilized to investigate different operating scenarios of the plant, such as during start up or shut down. Alternatively, the user can conduct sensitivity studies on different conditions or components to identify impact of technical or commercial risks.

A description of another embodiment of the invention illustrating the design of an oil refinery facility from a predefined linear program model of the subject facility follows.

The conceptual design of an oil refinery is a complex task involving the consideration of many economic and engineering factors to determine the optimum location and capacity of the refinery, which crude feedstocks it should process and which intermediate and final products it should produce to provide the best return on investment. These strategic or conceptual studies are frequently conducted utilizing a linear program (LP) (e.g., *Aspen PIMS* by assignee Aspen Technologies, Inc., Burlington, Mass.). Linear programming (LP) is a mathematical method for determining a way to achieve the best outcome (such as maximum profit or lowest cost) in a given mathematical model for some list of requirements represented as linear relationships. While modern LPs can handle some non-linear relationships, they typically cannot model non-linear unit operation models and complex physical property behavior to replicate the work carried out in a rigorous simulation model. In other words, a rigorous model provides much more specificity, i.e., granularity, for the model operations and physical properties. The LP defines at a high level the topology, including feed and product stream locations of the plant, feedstock specifications, conversion efficiencies of the major reactors and processing units, and product specifications, and enables a series of optimizations of design alternatives to be conducted to determine the most economic configuration. Aspen PIMS facilitates enterprise-wide planning through optimized feedstock evaluation, product slate optimization, plant design, and operational execution that enables refineries and petrochemical plants to run at optimal efficiency. The scalable single- or multi-user solution models linear and non-linear problems and interfaces to rigorous simulator models. An LP model does not model in detail process equipment types such as pumps, distillation columns and heat exchangers or complex phenomena such as multiphase flow and compressible flow. A rigorous process simulation is required to achieve a detailed understanding of such equipment types and behaviors. Current interfaces between LP models such as Aspen PIMS and rigorous simulation models require the pre-existence of the LP model and the rigorous simulation model and data is exchanged between them electronically. In this embodiment of the invention, the LP model is used to create the rigorous simulation, reducing significantly the time required to create the rigorous simulation model and improving the consistency between the two representations. In addition to the high level optimization determined by the LP, it is often desirable to have a more rigorous model of parts of the facility to validate certain assumptions or to size and cost certain equipment items.

A large amount of input data is needed to create a rigorous simulation of an oil refining facility. This input data is either known to the user of the simulator as a fact, or the user has to apply an engineering assumption based on experience or some industry or company guideline. The data that is typically entered in a rigorous simulation model includes, but is not limited to: compositions of all feed streams into the plant, conditions of all feed streams into the plant (flows, temperatures and pressures), ambient conditions of the location in which the plant is to be built (e.g., air temperatures, water temperatures, etc.), conditions of all process utilities that will be used in the plant (e.g., steam, hot oil, cooling water, etc.), specifications for the desired products of the plant, (e.g., light distillates (LPG, gasoline, naptha), middle distillates (kerosene and diesel), heavy distillates (heavy fuel oil, lube oils, wax, and asphalt), and any known constraints (e.g., emission limits for byproducts).

The user then has to select process equipment items (e.g., pumps, compressors, pipelines, separation vessels, distillations columns, absorber columns, mixers, and branches) and connect them together in an appropriate order for the plant to operate. The process simulation application (e.g., HYSYS® by assignee Aspen Technologies, Inc., Burlington, Mass.) will then calculate all the flows and conditions throughout the facility by utilizing the fundamental principles of physics, chemistry, and mathematics to ensure that the design is practical and achievable. The process simulation application (i.e., process simulator) also typically calculates the mass and energy balance for the plant.

Building a rigorous process simulation of a refinery is time consuming and requires the transcription and interpretation of data from the LP and the additional data provided from other sources and engineering disciplines such as process engineering.

To create such a design requires many hours of work even for an experienced engineer. To help overcome the time constraints faced by the user of process simulation, most modern commercial process simulators (e.g., ProII by Invensys of Plano, Tex., Unisim by Honeywell of Phoenix, Ariz.) enable a user to save a template of a process or a sub-process which can be reused and edited by the user. This approach is typically used for sub-processes. For entire processes, there is usually substantial variation in conditions and constraints so that the use of templates becomes inefficient and an additional administrative burden.

The present invention also utilizes a library of templates for well defined industry processes and sub-processes, but overcomes the shortfalls described above by supplementing these templates with a set of rules built into an application. The rules are embodied in the application as a set of mathematical expressions and algorithms within the software code. The rules act in several ways:

i) they interpret the LP model to determine feedstock specifications in step 150 in FIG. 1A, facility topology to connect the sub-processes on the main rigorous simulation flowsheet 605 in FIG. 1F in accordance to the definitions from the LP model, reactor/conversion unit types and efficiencies in step 220 in FIG. 1B, such as atmospheric distillation, vacuum distillation, gas processing, hydrotreater, isomerization unit, catalytic reformer, hydrocracker, and fluid catalytic cracker (FCC) feed hydrotreater, and product specifications in step 160 in FIG. 1A, and automatically complete the input data set, so that the user only has to input a fraction of the data normally required. The principal reactor/conversion unit processes are then modeled with rigorous kinetic models or the LP submodel calculation blocks are placed on the main flow sheet 605 in FIG. 1F;

ii) they interpret libraries of data (e.g., physical property data, geographic crude oil assay data, geographic ambient conditions data, process utility data, product specification data) and automatically complete the input data set, so that the user only has to input a fraction of the data normally required;

ii) they interpret the completed input data set to determine the configuration of the plant required to process the plant feed streams so as to comply with the desired product specification;

iii) they generate key sub-processes by connecting process equipment items and streams to generate templates;

iv) they extract templates from a library of sub-processes according to the required configuration; and v) they connect the templates retrieved from the library to match the high level topology defined in the LP model together with those generated by prior rules (e.g., templates generated by iii) above).

Once the rules have been applied in their entirety, or the user completes (or edits) the input data set as needed, the result is a rigorous simulation model of the oil refinery within the process simulator.

Figure 8:
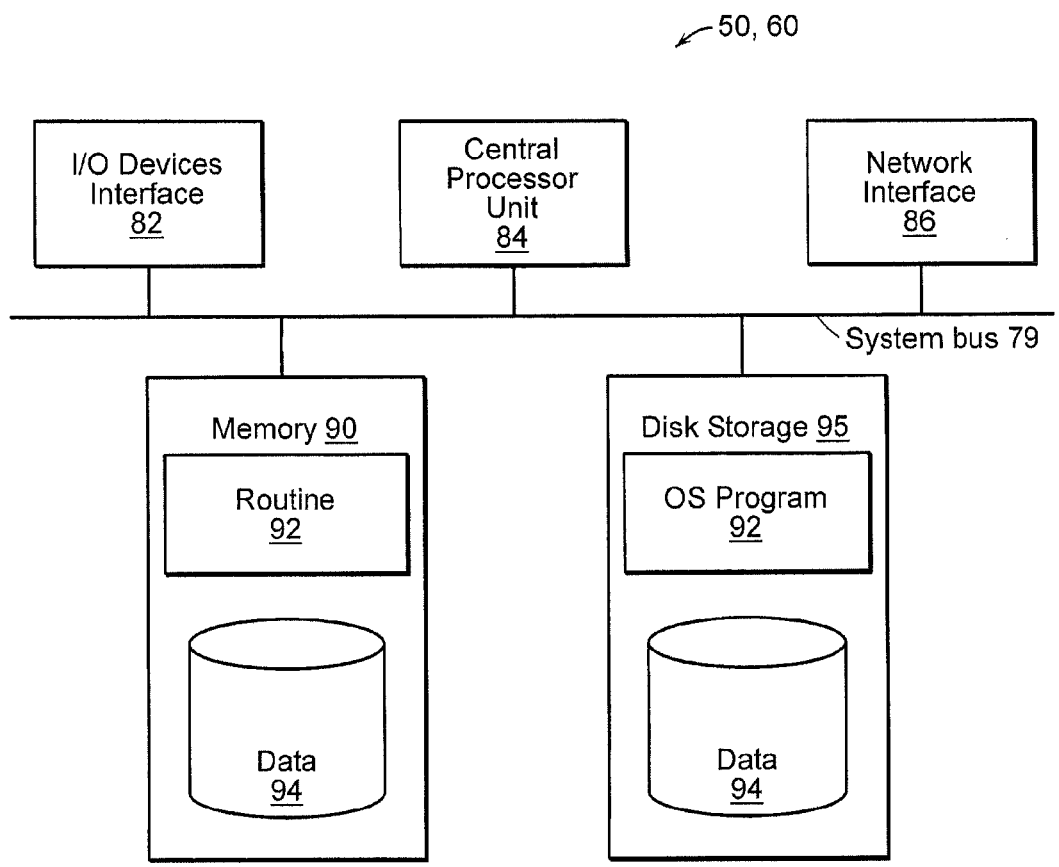
FIG. 8 is a block diagram of a computer apparatus implementing methods and systems of the present invention.

FIG. 8 is a diagram of the internal structure of a computer (e.g., client processor/device 50 or server computers 60) in a computer network or other computer based environment in which embodiments of the present invention can be implemented. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., global computer network, local area network, wide area network, and the like). Memory 90 provides volatile storage for computer software instructions 92 and data 94 used to implement an embodiment of the present invention (e.g., illustrated in FIGS. 1A-F and supporting code detailed above and below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier medium encompasses the foregoing transient signals, propagated signals, propagated medium, storage medium and the like.

There are certain conditions in the operation of an oil and gas separation process plant that can lead to the failure of the operation. These conditions are a function of the fluids passing through the plant and the operating pressures and temperatures of different parts of the plant. Once the invention has auto-generated the rigorous flowsheet, the user can invoke routines within the simulator to test for the likelihood of certain issues, such as, for example, carbon dioxide corrosion rate calculation, hydrate formation prediction in gas streams, carbon dioxide freeze out prediction in streams, and liquid slug formation prediction in flowlines.

Templates of Sub-Processes Used in Generation of the Rigorous Simulation Case

As described above the invention uses a series of rules to predetermine appropriate inputs, screen feasible processing alternatives and assemble the rigorous process simulation. Some parts of the rigorous simulation are generated programmatically and some are generated from preassembled templates. The choice of rule or template depends on the complexity of the sub-process and the number of feasible alternatives for that sub-process (and is largely a software development decision). For the oil and gas separation example, the sub-process templates listed in Table 1 below have been used to augment the rules.

TABLE 1

Sub-process templates

| Sub Process | Template/Rule |
| --- | --- |
| Separation Train (gas, oil, water separation) | Created Programmatically by Rule (see above) |
| Compression Train | Created Programmatically by Rule (see above) |
| Gas Lift Compression Train | Created Programmatically by Rule (see above) |
| Gas Re-injection Compression Train | Created Programmatically by Rule (see above) |
| Gas Dehydration (with TEG) Component Splitter | Template (default) |
| Gas Dehydration (TEG) Rigorous Absorber | Template (option) |
| Gas Dehydration (TEG Rigorous Absorber and Regenerator | Template (option) |
| Gas Dehydration (with MEG) Component Splitter | Template (default) |
| Gas Dehydration (MEG) Rigorous Absorber | Template (option) |
| Gas Dehydration (MEG Rigorous Absorber and Regenerator | Template (option) |
| Gas Dehydration (with EG) Component Splitter | Template (default) |
| Gas Dehydration (EG) Rigorous Absorber | Template (option) |
| Gas Dehydration (EG Rigorous Absorber and Regenerator | Template (option) |
| Gas Sweetening Component Splitter (MDEA) | Template (default) |
| Gas Sweetening Rigorous Absorber (MDEA) | Template (option) |
| Gas Sweetening Rigorous Absorber and Regenerator (MDEA) | Template (option) |
| Gas Sweetening Component Splitter (DEA) | Template (default) |
| Gas Sweetening Rigorous Absorber (DEA) | Template (option) |
| Gas Sweetening Rigorous Absorber and Regenerator (DEA) | Template (option) |
| Gas Sweetening Component Splitter (MEA) | Template (default) |
| Gas Sweetening Rigorous Absorber (MEA) | Template (option) |
| Gas Sweetening Rigorous Absorber and Regenerator (MEA) | Template (option) |
| Gas Sweetening Component Splitter (MDEA & Pz) | Template (default) |
| NGL Sweetening (of Liquid) | Template |
| Glycol/Methanol Recovery | Template |
| Pipeline/Pipeline Network | Created Programmatically by rule |
| Crude Oil Stabilization | Created Programmatically by rule |
| NGL Fractionation Strategy | User Spec/Rule |
| NGL Fractionation | Template |
| Demethaniser | Template |
| Deethaniser | Template |
| Debutaniser | Template |
| Depropaniser | Template |
| Vapour Recovery Unit | Template |
| Fuel Gas Expander | Template |
| Propane Refrigeration Gas Plant | Template |
| Turbo Expander Cryogenic Gas Plant | Created programmatically by rule |
| Nitrogen Rejection Unit | Template |
| Desalting | Created Programmatically by rule |
| High CO2 Removal, membrane purification | Template |
| Produced Water and Injection | Template augmented by programmatic rule |

Description of Sub-Process Templates

Gas-To-Oil Ratio Adjustment Sub-Process

The selected or specified crude oil stream, together with a gas feed stream and a water feed stream, are introduced to a mixer that operates at 15° C. and atmospheric pressure. The quantity of gas and water are altered until they meet the specified gas-to-oil ratio and water-to-oil ratio at the reference conditions specified by the user.

Oil and Gas Separation Sub-Process

Figure 9:
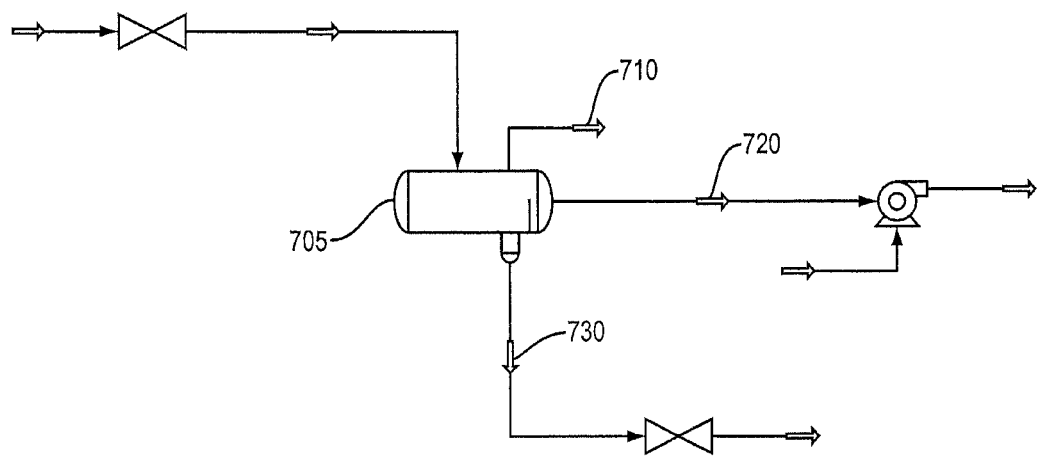
FIG. 9 is an illustration of a typical flowsheet of a single stage separation sub-process considered by embodiments of the present invention.
Figure 10:
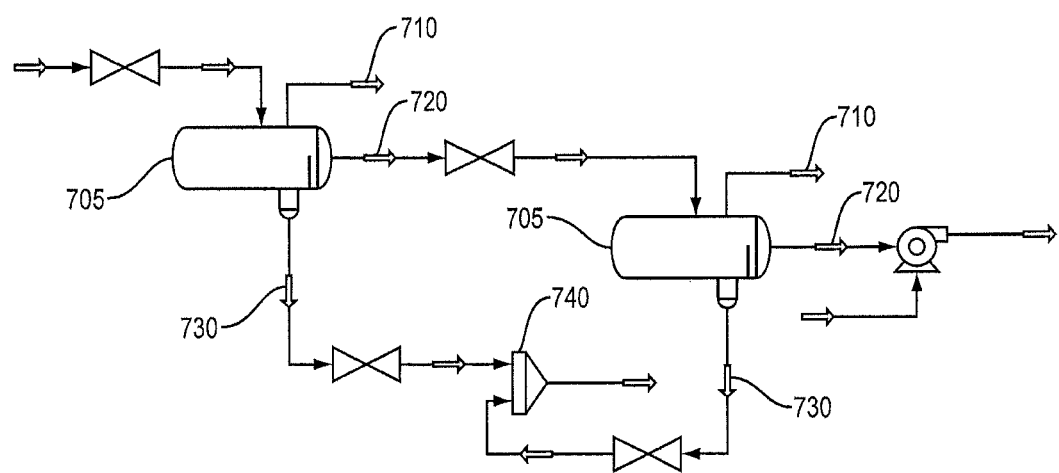
FIG. 10 is an illustration of a typical flowsheet of a two stage separation sub-process in embodiments of the present invention.
Figure 11:
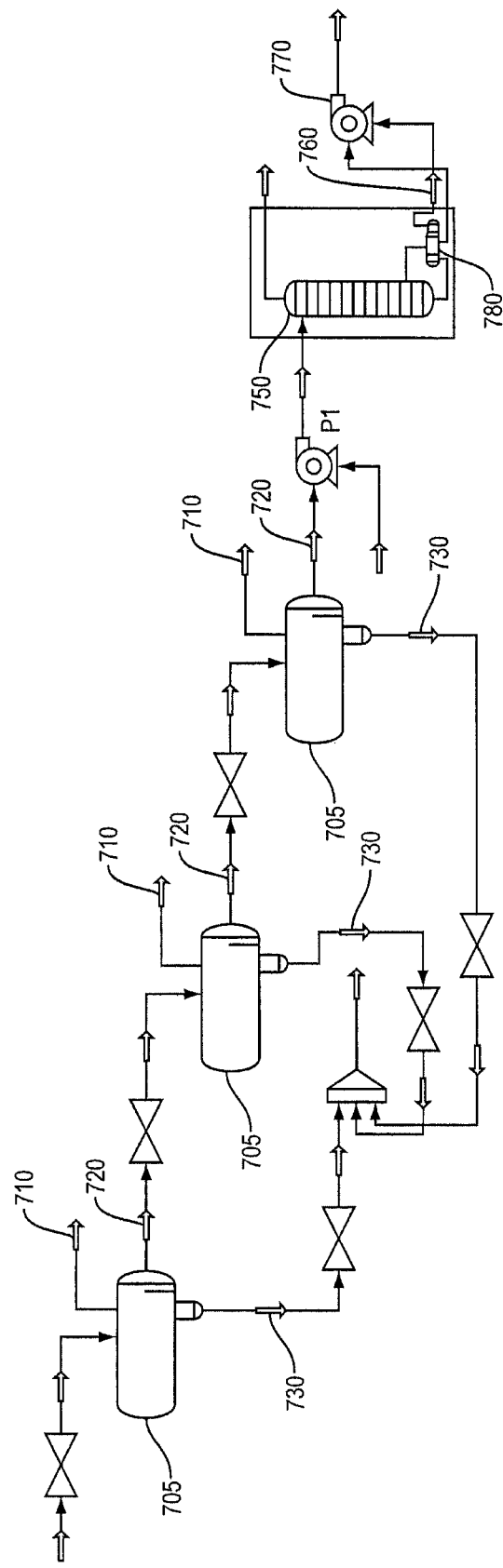
FIG. 11 is an illustration of a typical flowsheet of a three stage separation sub-process with a stabilizer column in embodiments of the present invention.

In an oil and gas separation sub-process 700, in one non-binding example embodiment shown in FIG. 9, the mixture then passes through a series of separator vessels where the hydrocarbon mixture is separated into different phases: liquid hydrocarbon (oil and condensate), liquid water, and gas. Depending on the operating pressure of the vessel 705, the gas phase leaves the vessel 705 through the top exit stream 710, and the oil and water separate in the body of the vessel 705 due to density differences between the two phases. The oil phase rises to the top of the liquid space and leaves the vessel 705 through outlet 720, the higher of the two liquid outlets, and passes to the next separator vessel, and the water falls to the base of the vessel 705 and leaves via the lowest outlet 730. This separation can be achieved in a series of stages, typically one to three stages, as shown in FIGS. 9-11, respectively, with each subsequent separator stage being at a reduced pressure from the previous stage. The application provides recommended pressures for each stage. The user can overwrite the recommended values. The number of stages required depends on the export specifications for the gas, oil, and water. The water streams 730 from the different separator vessels 705 are recombined, as shown in FIG. 10, and passed through a produced water pump 740 that pumps the water to export pressure, and, if required, to the produced water sub-process.

Produced Water Sub-Process

In the event that the produced water contains more than 1% of solids, the water stream is passed through a hydrocyclone to remove the solids.

Stabilization Sub-Process

Figure 10A:
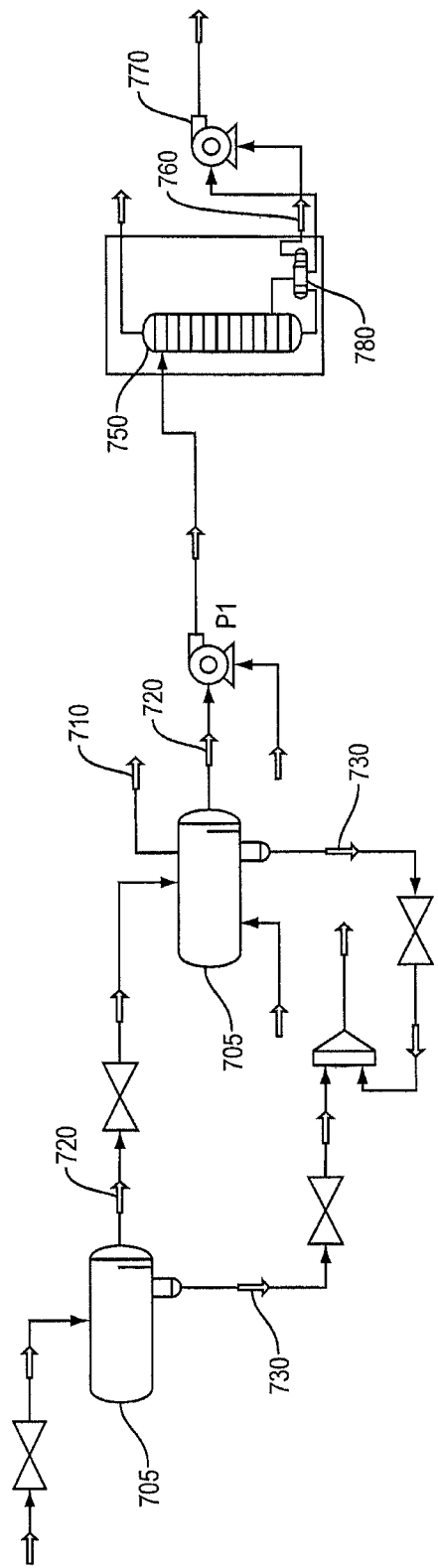
FIG. 10A is an illustration of a typical flowsheet of a two stage separation sub-process with a stabilizer column in embodiments of the present invention.

In the event that a very low Reid vapor pressure is specified for the export oil, it may be necessary to include a stabilization column 750 on the oil produced from the final separator vessel 705, as shown in FIGS. 10A and 11. In this instance, the oil 720 from the final separator is pumped to the top stage of a stabilizer column 750. Lighter hydrocarbons in the crude oil are vaporized and pass up the column 750 and leave via the top of the column 750. The stabilized crude oil leaves the base of the column 760 and is passed to the crude oil export pump 770 to be pumped to the crude oil export location at the specified pressure. A portion of the stabilized crude oil is heated in a reboiler (heat exchanger) vessel 780 via indirect heating with steam or hot oil and returned to the base of the column 750. This provides the heat energy required to vaporize the lighter hydrocarbons to ensure that the crude meets the Reid vapor pressure specification. The stabilizer overhead gas may be used for fuel gas or set to flare.

Compression Sub-Process

Figure 12:
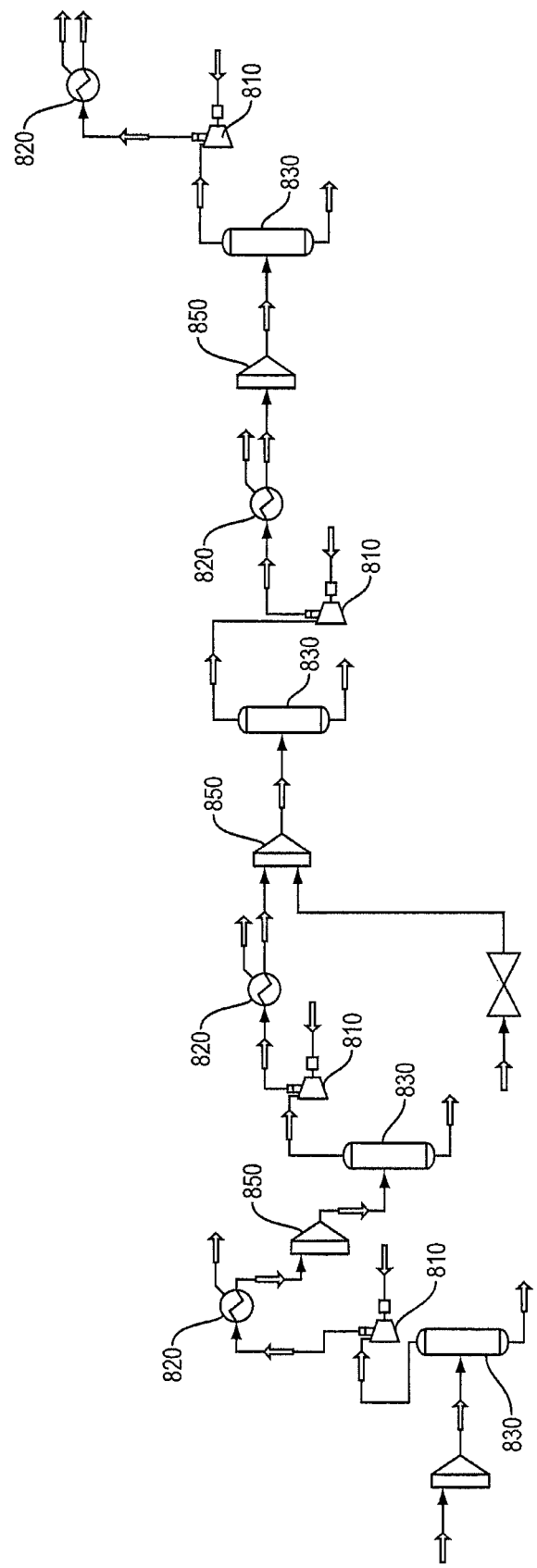
FIG. 12 is an illustration of a typical flowsheet of a gas compression sub-process in embodiments of the present invention.

The gas leaving the separator vessels needs to be recompressed so that it can be passed through the subsequent processing steps and reaches the specified outlet location at the desired pressure. As shown in FIG. 12, the recompression of the gas is typically achieved by a series of compressors 810 placed in series. The outlet of each compressor passes through an intercooler 820 and a flash vessel 830 to remove any liquids and then into the next compressor 810. The purpose of the intercooler 820 and flash vessel 830 is to remove any liquids that may form during the compression and damage the compressor's internal parts.

The total flow can also be split among parallel trains. This is done to provide operation flexibility and enable maintenance. The user is able to specify the number of parallel trains. The total flow is divided between the number of specified trains prior to determining the number of compressors in series. The number of compressors 810 in series is determined by calculating the difference between the pressure of the gas leaving the final separator stage and the pressure required to meet the gas export pressure specification, (once corrections have been made for the pressure drop through any subsequent gas treatment processes such as acid gas cleaning and gas dehydration) and dividing that number by the maximum allowable pressure ratio for a single compressor. The higher integer value is selected as the number of compressors in series. Typically, a gas compression ratio between 2 and 4.5 is used. This is typically a company best practice, or specified by the manufacturer of the compressor.

The outlet pressure of each compressor is determined by multiplying the inlet pressure by the compression ratio. The outlet pressure of the final compressor is defined by the gas export pressure specification. The user specifies a value. A default value of 3 is offered by the application.

Alternatively, the maximum compressor duty is calculated, and the number of compressors required is determined by dividing the total compression duty by the maximum duty per compressor. Again, this is typically a company best practice and is specified by the user.

The gas from the other separator vessels in the separation sub-process is introduced via a mixer 850 and a control valve into the streams between the individual compressors. The mixer 850 is located between the intercooler 820 and the flash vessel 830. The separator outlet gas 710 from the various separator vessels 705 in the separation sub process is introduced into the compression train at an appropriate mixer location by selecting the compressor inlet stream which is nearest (but lower) in pressure to the separator 710 outlet gas pressure. The pressures in the two streams are equalized using the control valve.

Gas Lift Compression Sub-Process

If the user has specified a gas lift requirement and a gas lift pressure, a branch stream is taken from the outlet of the gas dehydration sub-process and a similar series of calculations as detailed above is carried out to determine the number of gas lift compressors required.

Gas Re-Injection Sub-Process

If the user has specified a gas re-injection requirement and a gas re-injection pressure, a further branch stream is taken from the outlet of the gas dehydration sub-process and a similar series of calculations as detailed above is carried out to determine the number of gas re-injection compressors required.

Gas Sweetening Sub-Process

If the feed specification indicates the presence of acid gases, primarily carbon dioxide and hydrogen sulfide, a gas sweetening (acid gas removal sub-process) can be required prior to the export of the gas. The user specifies the export quality of the gas in terms of the allowable concentration of these acid gases in the export gas stream. The removal of acid gases prevents the corrosion of downstream equipment and pipelines and ensures that the gas complies with specifications of the various consumers.

Figure 13:
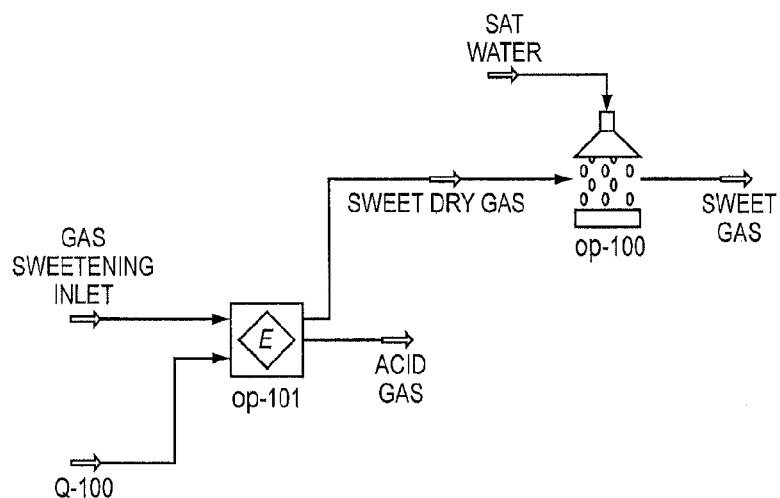
FIG. 13 is an illustration of a typical flowsheet of a gas sweetening sub-process using a component splitter in embodiments of the present invention.

If gas sweetening is required, the outlet gas from the gas compression sub-process (FIG. 12) are treated according to the methods selected by the user. The user can choose to model the process using a rigorous amine process (with or without amine regeneration) or can choose to model the process with a more simplistic approach using a component splitter, as shown in FIG. 13. The choice of the component splitter approach can be used to approximate the treatment of these gases using molecular sieve beds.

Figure 14:
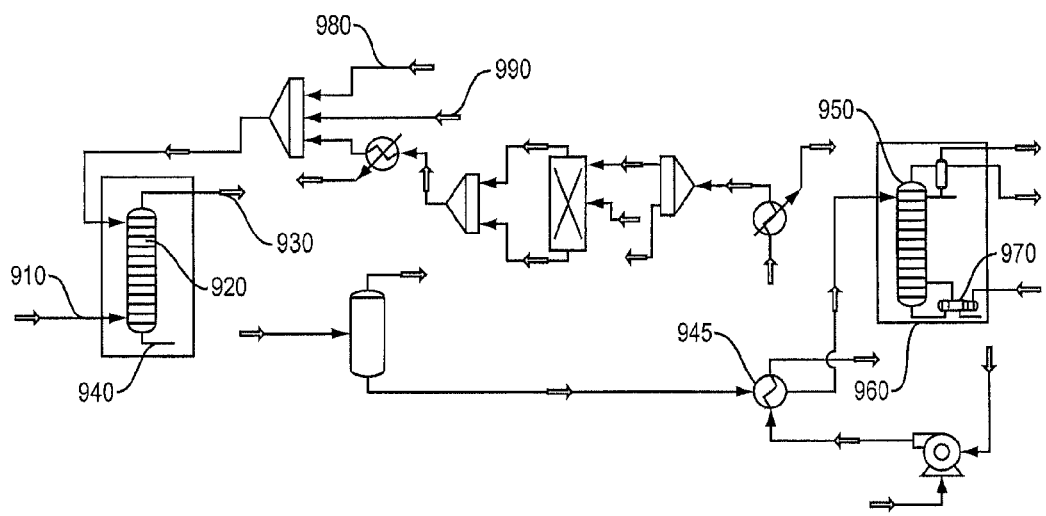
FIG. 14 is an illustration of a typical flowsheet of a rigorous gas sweetening sub-process with a regenerator column in embodiments of the present invention.

If the user chooses to model the amine process rigorously, then a range of amines is available to use in the process. These include MEA, MDEA, DEA, MDEA+Pz, and DPEG. As shown in FIG. 14, the compressor outlet gas 910 is introduced beneath the bottom stage of an amine contactor column 920. It passes up the column 920 counter-currently to the amine solution which is introduced above the top stage. The acid gas components are absorbed by the amine solution and the cleaned (sweet) gas 930 exits from the top of the tower. The amine solution 940 exiting the base of the tower is recycled via a regeneration column 950. Heat is applied to the amine solution to liberate the carbon dioxide and hydrogen sulfide.

If the user selects to model the amine unit with a regenerator, then the amine solution from the bottom of the absorber column flows through a heat exchanger 945, where it is heated prior to entering on the top stage of the regenerator column 950. The amine solution falls down the column 950 where it comes in contact with warm stripping gas passing up the column. The warm stripping gas extracts the carbon dioxide and hydrogen sulfide from the liquid and exits the top of the tower 950. The stripping gas typically goes to flare or re-injection into the field. A liquid exiting the base of the column is the regenerated amine solution 960. A portion of this is heated in a reboiler 970 to generate the stripping gas that flows up the column 950. The remaining regenerated amine solution is cooled by passing through the heat exchanger 945 carrying the amine solution and in doing so recovers energy. The regenerated amine solution is then pumped to the top of the absorber column 920 to clean the gas stream. A water make-up stream 980 and an amine make-up stream 990 are added to compensate for losses in the overhead gas stream from the amine contactor column 950 and the degeneration of amine over time.

Gas Dehydration Sub-Process

If the feed specification indicates the presence of water, or the gas has been subjected to gas sweetening, dehydration may be required prior to the export of the gas. The user specifies the export quality of the gas in terms of the allowable water dew point temperature in the export gas stream. The removal of water gases prevents corrosion and the formation of methane hydrates in downstream equipment and pipelines, and ensures that the gas complies with specifications of the various consumers.

Figure 15:
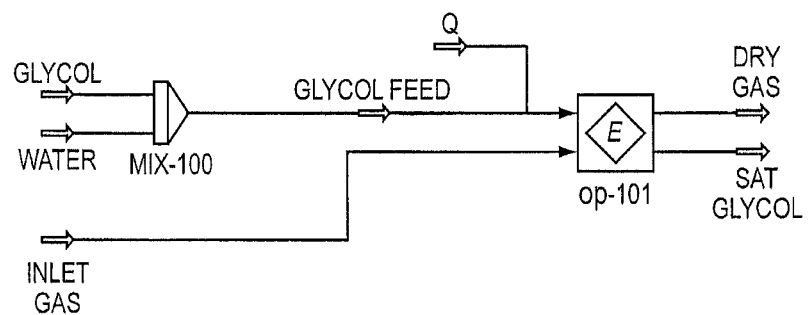
FIG. 15 is an illustration of a typical flowsheet of a gas dehydration sub-process using a component splitter in embodiments of the present invention.

If gas dehydration is required, the outlet gas from the gas sweetening sub-process (FIG. 13 or 14) is treated according to the methods selected by the user. The user can choose to model the process using a rigorous dehydrations process (with or without glycol regeneration), or to model the process with a more simplistic approach using a component splitter, as shown in FIG. 15. The component splitter approach can be used to approximate the treatment of these gases using molecular sieve beds.

Figure 16:
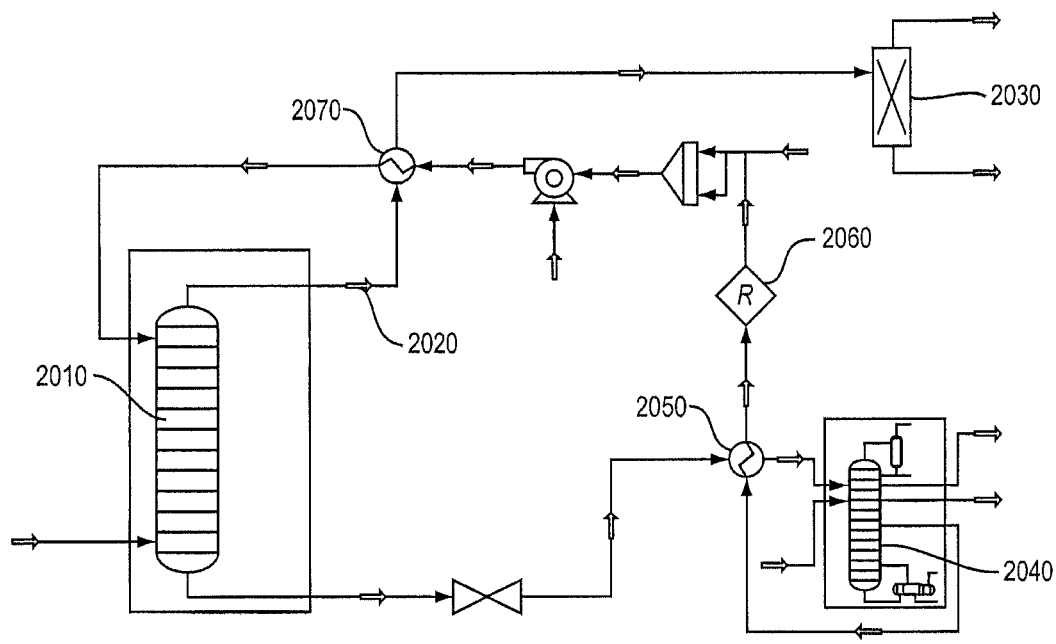
FIG. 16 is an illustration of a typical flowsheet of a rigorous gas dehydration sub-process with a regenerator column in embodiments of the present invention.
Figure 17:
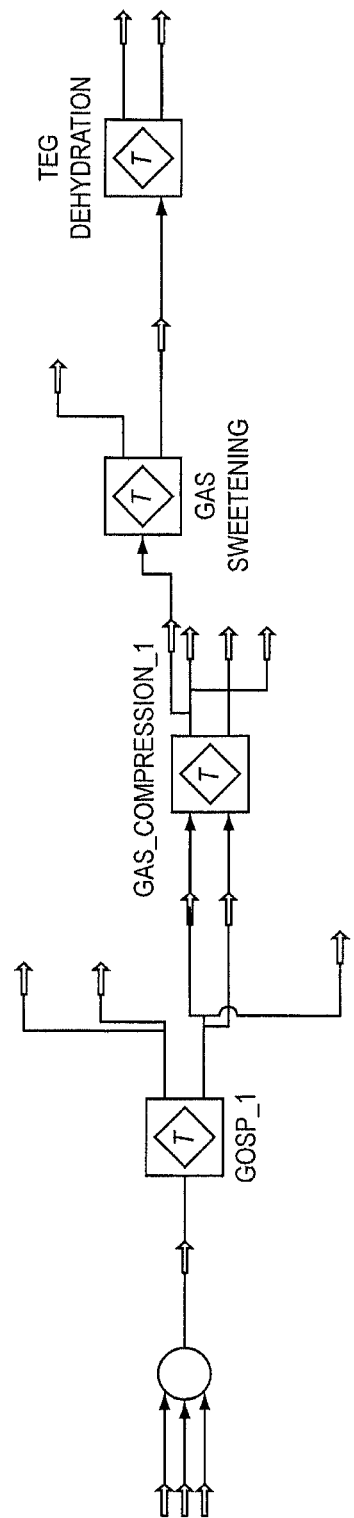
FIG. 17 is an illustration of a typical flowsheet combining oil and gas separation, gas compression, gas sweetening, and gas dehydration sub-processes in embodiments of the present invention.

If the user opts to model the dehydration process rigorously, then a range of glycols is available to use in the process. These include EG, TEG, and DEG. As shown in FIG. 16, the compressor outlet gas (FIG. 12) or the sweet gas (FIG. 13 or 14) is introduced beneath the bottom stage of a glycol absorber column 2010. It passes up the column counter-currently to the glycol solution which is introduced above the top stage. The water is absorbed by the glycol solution and the (dry) gas 2020 exits from the top of the tower. Any glycol solution that has been entrained in the gas stream is removed by heating and passing through a knock out vessel 2030. FIG. 17 shows the sequence of separation, compression, sweetening, and dehydration, whereby the sweet dry gas is now in compliance with the export gas specification.

Turning back to FIG. 16, the saturated glycol solution exiting the base of the tower 2010 is recycled via a regeneration column 2040. Heat is applied to the glycol solution to liberate the water and enable the glycol solution to be reused to treat additional gas. If the user selects to model the glycol unit with a regenerator 2040, the glycol solution from the bottom of the glycol contactor column 2010 flows through a heat exchanger 2050, where it is heated prior to entering the top stage of the regenerator column 2040. The glycol solution falls down the column 2040 where it comes in contact with warm stripping gas passing up the column 2040. The warm stripping gas extracts the water from the liquid and exits the top of the tower 2040. The stripping gas typically goes to flare or re-injection into the field.

Glycol solution exiting the base of the column 2040 is the regenerated glycol solution. A portion of this solution is heated in a reboiler 2060 to generate the stripping gas that flows up the column. The remaining regenerated glycol solution is cooled by passing through the heat exchanger 2070 carrying the glycol solution and in doing so recovers energy. The regenerated glycol solution is then pumped to the top of the glycol contactor column to dry the gas stream. A make-up stream of fresh glycol is added to allow for losses of glycol in the contactor column overhead gas stream and for the degeneration of glycol over time.

The relevant teachings of all patents, published applications and references cited herein are incorporated by reference in their entirety.

As can be seen by the above, embodiments of the present invention provide a consistent framework for making technical and commercial decisions at the early stages of a plant or process assessment. The invention application reduces the time required to develop a conceptual design and costing of an oil and gas facility, and facilitates a consistent approach to design and analysis.

In particular, significant financial risk is involved with the development of an asset and the transition from conceptual into front-end engineering design. The rapid screening of design alternatives for commercial feasibility helps reduce that risk and is made possible with embodiments of the present invention. It guides the user through project set up, definition of the production fluid, export specifications, and the anticipated production profile. The user is then guided through a series of plant configuration/design options based upon company standards or industry norms, after which the conceptual process design of the asset is created.

Embodiments enable multiple design scenarios to be studied throughout the entire operational life of the asset. Users are able to consider several development strategies for technical and commercial feasibility and for early identification of project risks, enabling companies to compress the design cycle and achieve a higher return on investment.

Key benefits include:

enables development of a rigorous facilities simulation from preliminary field data (e.g., GOR and production rate);

delivers accelerated development of conceptual facilities design and costing;

provides a consistent approach to design and decision making;

enables an efficient transfer of design data and intent from owner operator to engineering consultant;

enables efficient transfer of design intent and data from conceptual to feed and detailed design stages;

reduces project schedules and engineering man-hours; and accelerates technical and commercial decision making at the early stages of a plant or process assessment.

Key technical features include:

rapid generation of conceptual designs and associated capital and operating expense analysis for oil and gas production facilities;

development of rigorous, detailed and extensible simulations from preliminary field data;

case study analysis of multiple design scenarios over the production life cycle (e.g., production, energy, emissions);

generation of detailed Aspen HYSYS® simulation case files for each design scenario;

rapid determination of equipment sizes and weights;

development of cost estimates using Aspen Process Economic Analyzer (Aspen Technologies, Inc., Burlington, Mass.) for one or for all of the Aspen HYSYS cases; and Microsoft® Excel reporting of plant configuration, heat and mass balance, production profile and emissions profile.

While this invention has been particularly shown and described with references to example embodiments thereof, it will be understood by those skilled in the art that various changes in form and details may be made therein without departing from the scope of the invention encompassed by the appended claims.

What is claimed is:

1. A computer modeling apparatus, comprising:
   an input module for forming and bringing into existence a plant design of a subject chemical processing facility-to-be, said input module enabling a user to input certain specifications of the plant design, said certain specifications being limited data that is preliminary field data that fails to meet requisites for rigorous simulators, and being different from other specifications of the plant design, wherein the plant design includes design alternatives of the subject chemical processing facility-to-be;

a processor routine coupled to the input module and responsive to the user input certain specifications by forming an input data set for a rigorous simulation modeler, the processor routine automatically forming the input data set from the limited data of the user input certain specifications, the processor routine executing the simulation modeler using the formed input data set to model the plant design of the subject chemical processing facility-to-be including modeling mass balance and energy balance for the plant design, such that said execution of the simulation modeler results in a rigorous simulation model of the plant design of the subject chemical processing facility-to-be, wherein the rigorous simulation modeler requires input beyond the limited data that was input by the user at the input module;

an interface member generating a graphical representation of the plant design of the subject chemical processing facility-to-be from the resulting rigorous simulation model, said rigorous simulation model including equipment design of the subject chemical processing facility-to-be from the simulation modeler; and an output member coupled to the interface member displaying to a user the generated graphical representation of the plant design of the subject chemical processing facility-to-be, the interface member and the output member enabling user interaction with the plant design via the generated graphical representation.

2. The computer modeling apparatus of claim 1, wherein the limited data includes any combination of a type of chemical processing facility, a production rate profile, a geographic location, environmental factors, political factors, social factors, feedstock pricing, and product pricing.

3. The computer modeling apparatus of claim 1, wherein the limited data includes a predefined linear program model of the subject chemical processing facility, including facility topology, feedstock specifications, principal reactor/conversion unit processes, product specifications, and design alternatives.

4. The computer modeling apparatus of claim 1, wherein the processor routine employs any one of a feedstock database, a process utility specifications database, an ambient conditions database, or a combination thereof to form the input data set.

5. The computer modeling apparatus of claim 1, wherein the input module streamlines user work-flow of inputting data for the simulation modeler.

6. The computer modeling apparatus of claim 1, wherein the processor routine employs one of rules-based decision making, a set of templates, database data, or a combination thereof.

7. The computer modeling apparatus of claim 1, wherein the simulation modeler is a process simulator.

8. The computer modeling apparatus of claim 7, wherein the produced simulation model is extensible and user edited and user adapted.

9. The computer modeling apparatus of claim 1, wherein the subject chemical processing facility-to-be is one of an oil processing facility, a gas processing facility, or an oil and gas separation facility.

10. A simulation modeler system comprising:

an input assembly for forming and bringing into existence a plant design of a subject chemical processing facility-to-be, said input assembly enabling a user to input certain specifications of the plant design, said certain specifications being limited data that is preliminary field data that fails to meet requisites for rigorous simulators, and being different from other specifications of the plant design, wherein the plant design includes design alternatives of the subject chemical processing facility-to-be;

the input assembly being responsive to the user input certain specifications by automatically forming therefrom an input data set configured for a rigorous simulation modeler from the limited data of the user input certain specifications, the rigorous simulation modeler requiring input beyond the limited data of the user input certain specifications that were input by the user at the input assembly, the simulation modeler being coupled to receive the formed input data set from the input assembly and being configured to execute in response to the input data set to model the plant design of the subject chemical processing facility-to-be including modeling mass balance and energy balance for the plant design, said execution of the simulation modeler using the formed input data set resulting in a rigorous simulation model of the plant design of the subject chemical processing facility-to-be;

an interface member generating a graphical representation of the plant design of the subject chemical processing facility-to-be from the resulting rigorous simulation model, said rigorous simulation model including equipment design of the subject chemical processing facility-to-be from the simulation modeler; and an output member coupled to the interface member displaying to a user the generated graphical representation of the plant design of the subject chemical processing facility-to-be, the interface member and the output member enabling user interaction with the plant design via the generated graphical representation.

11. The simulation modeler system of claim 10, wherein the limited data includes any combination of a type of chemical processing facility, a production rate profile, a geographic location, environmental factors, political factors, social factors, feedstock pricing, and product pricing.

12. The simulation modeler system of claim 10, wherein the limited data includes a predefined linear program model of the subject chemical processing facility, including facility topology, feedstock specifications, principal reactor/conversion unit processes, product specifications, and design alternatives.

13. The simulation modeler system of claim 10, wherein the input assembly employs any one of a feedstock database, a process utility specifications database, an ambient conditions database, or a combination thereof to form the input data set.

14. The simulation modeler system of claim 10, wherein the input assembly stream lines user work-flow of inputting data for the simulation modeler.

15. The simulation modeler system of claim 10, wherein the input assembly employs one of rules-based decision making, a set of templates, database data, or a combination thereof to form the input data set from the user input certain specifications.

16. The simulation modeler system of claim 10, wherein the simulation modeler is a process simulator.

17. The simulation modeler system of claim 16, wherein the produced simulation model is extensible and user edited and user adapted.

18. The simulation modeler system of claim 10, wherein the subject chemical processing facility-to-be is one of an oil processing facility, a gas processing facility, or an oil and gas separation facility.

19. A computer-implemented method of designing a chemical processing plant comprising:
   a) receiving inputted limited data for forming and bringing into existence a plant design of a subject chemical processing facility, said inputted limited data including certain specifications of the plant design, said certain specifications being limited data that is preliminary field data that fails to meet requisites for rigorous simulators, and being different from other specifications of the plant design, wherein the plant design includes design alternatives of the subject chemical processing facility-to-be;
   b) using a processor routine to automatically form from the received limited data of the certain specifications, an input data set for a rigorous simulation modeler that requires input beyond the limited data;
   c) executing the simulation modeler using the formed input data set to produce a rigorous simulation model including mass balance and energy balance for the plant design of the subject chemical processing facility-to-be, the rigorous simulation model including equipment design of the subject chemical processing facility-to-be; and
   d) outputting the rigorous simulation model of the plant design of the subject chemical processing facility to one of a computer display monitor, an output file, or a combination thereof, the outputting enabling user interaction with the plant design via a generated graphical representation of the plant design.

20. The method of claim 19, wherein the processor routine employs one of rules-based decision making, a set of templates, database data, or a combination thereof.

21. The method of claim 19, wherein the simulation modeler is a process simulator.

22. The method of claim 21, wherein the produced simulation model is extensible and user edited and user adapted.

23. The method of claim 19, wherein the subject chemical processing facility-to-be is one of an oil processing facility, a gas processing facility, or an oil and gas separation facility.

24. The method of claim 19, wherein the limited data includes any combination of a type of chemical processing facility, a production rate profile, a geographic location, environmental factors, political factors, social factors, feedstock pricing, and product pricing.

25. The method of claim 24, wherein the type of chemical processing facility is one of an oil processing facility, a gas processing facility, or an oil and gas separation facility.

26. The method of claim 19, wherein the limited data includes a predefined linear program model of the subject chemical processing facility, including facility topology, feedstock specifications, principal reactor/conversion unit processes, product specifications, and design alternatives.

27. The method of claim 19, wherein the processor routine employs any one of a feedstock database, a process utility specifications database, an ambient conditions database, or a combination thereof to form the input data set.

28. The method of claim 27, further including revising the input data set by any one of defining a number of process trains, specifying preferred unit operations, specifying preferred types of equipment, specifying energy constraints, revising the ambient conditions, and revising the process utility specification or any combination thereof.

29. The method of claim 19, wherein executing the simulation modeler includes a computer implemented selection of feasible design alternatives and corresponding process templates from a process template library.

* * * * *